United States Patent
Coran et al.

(10) Patent No.: US 12,157,257 B2
(45) Date of Patent: Dec. 3, 2024

(54) COOLING AND RETAINING PIN FOR AN APPARATUS FOR COOLING AND HANDLING PREFORMS MADE OF PLASTIC MATERIAL

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Massimo Coran, Spresiano (IT); Marco Frare, San Fior (IT); Andrea Mariani, Conegliano (IT); Matteo Zoppas, Conegliano (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 0 days.

(21) Appl. No.: 17/629,391

(22) PCT Filed: Jul. 27, 2020

(86) PCT No.: PCT/IB2020/057057
§ 371 (c)(1),
(2) Date: Jan. 23, 2022

(87) PCT Pub. No.: WO2021/014431
PCT Pub. Date: Jan. 28, 2021

(65) Prior Publication Data
US 2022/0258396 A1     Aug. 18, 2022

(30) Foreign Application Priority Data
Jul. 25, 2019 (IT) .................. 102019000012876

(51) Int. Cl.
*B29C 45/72*     (2006.01)
*B29B 11/08*     (2006.01)
(Continued)

(52) U.S. Cl.
CPC .......... *B29C 45/7207* (2013.01); *B29B 11/08* (2013.01); *B29C 35/16* (2013.01);
(Continued)

(58) Field of Classification Search
CPC .. B29C 45/7202; B29C 45/4224; B29B 11/08
See application file for complete search history.

(56) References Cited

U.S. PATENT DOCUMENTS

| 7,591,975 B2 † | 9/2009 | Kintzinger |
| 2002/0074687 A1 * | 6/2002 | Neter ............... B29C 35/16 264/237 |

(Continued)

FOREIGN PATENT DOCUMENTS

| EP | 937566 A1 * | 8/1999 | ......... B29C 45/7207 |
| EP | 3395535 A1 | 10/2018 | |

(Continued)

OTHER PUBLICATIONS

International Search Report, dated Dec. 11, 2020, for corresponding International Patent Application No. PCT/IB2020/057057.
(Continued)

*Primary Examiner* — Jacob T Minskey
*Assistant Examiner* — Wayne K. Swier
(74) *Attorney, Agent, or Firm* — Troutman Pepper Hamilton Sanders LLP

(57) ABSTRACT

A cooling and retaining pin (1) for cooling, by air blowing, and retaining, by air suction, a plastic preform, the pin comprising a body (2), defining a longitudinal axis and having a first opening (5) at a first end thereof, coaxial to said longitudinal axis and adapted to be connected to a
(Continued)

handling station; a movable element (3) adapted to slide at least partially inside said body; at least one air passage gap provided at a second end of the body or at said first end; wherein the movable element (3) is adapted to move from a first position, to which a first air passage section corresponds, to a second position, to which a second air passage section corresponds, which is smaller than said first section, so as to adjust a blowing air flow during the cooling step and a suction air flow during the step of retaining the preform.

18 Claims, 18 Drawing Sheets

(51) Int. Cl.
*B29C 35/16* (2006.01)
*B29C 45/42* (2006.01)
*B29C 45/82* (2006.01)
*B29C 49/06* (2006.01)
*B29C 49/64* (2006.01)

(52) U.S. Cl.
CPC .......... *B29C 45/4225* (2013.01); *B29C 49/06* (2013.01); *B29C 49/6427* (2013.01); *B29C 2045/725* (2013.01); *B29C 2045/822* (2013.01)

(56) References Cited

U.S. PATENT DOCUMENTS

| | | | |
|---|---|---|---|
| 2006/0138696 A1* | 6/2006 | Weinmann | B29C 45/7207 264/237 |
| 2008/0166209 A1* | 7/2008 | Kintzinger | B29C 45/4225 414/217 |
| 2010/0255138 A1* | 10/2010 | Deckers | B29C 45/7207 62/62 |
| 2017/0274570 A1* | 9/2017 | Schad | B29C 45/7207 |
| 2018/0304511 A1* | 10/2018 | Unterlander | B29B 11/08 |

FOREIGN PATENT DOCUMENTS

| | | |
|---|---|---|
| WO | 02/087848 A1 | 11/2002 |
| WO | 2008/083460 A1 | 7/2008 |
| WO | 2012/003583 A1 | 1/2012 |
| WO | 2013/106927 A1 | 7/2013 |
| WO | 2016/061682 A1 | 4/2016 |
| WO | 2018/055142 A1 | 3/2018 |

OTHER PUBLICATIONS

EP Office Action for EP 20 764 148.1—1014, dated Sep. 21, 2023.

\* cited by examiner
† cited by third party

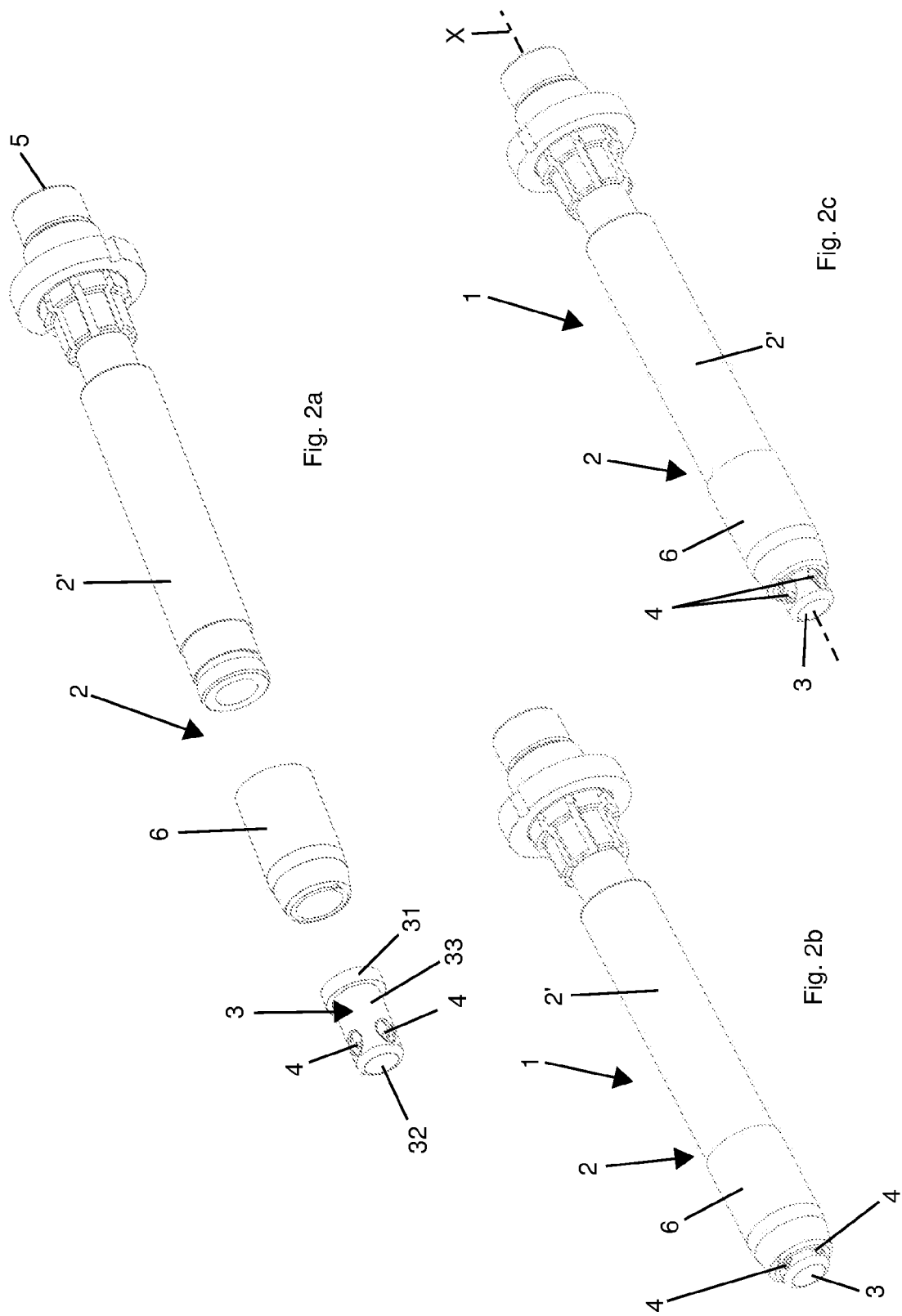

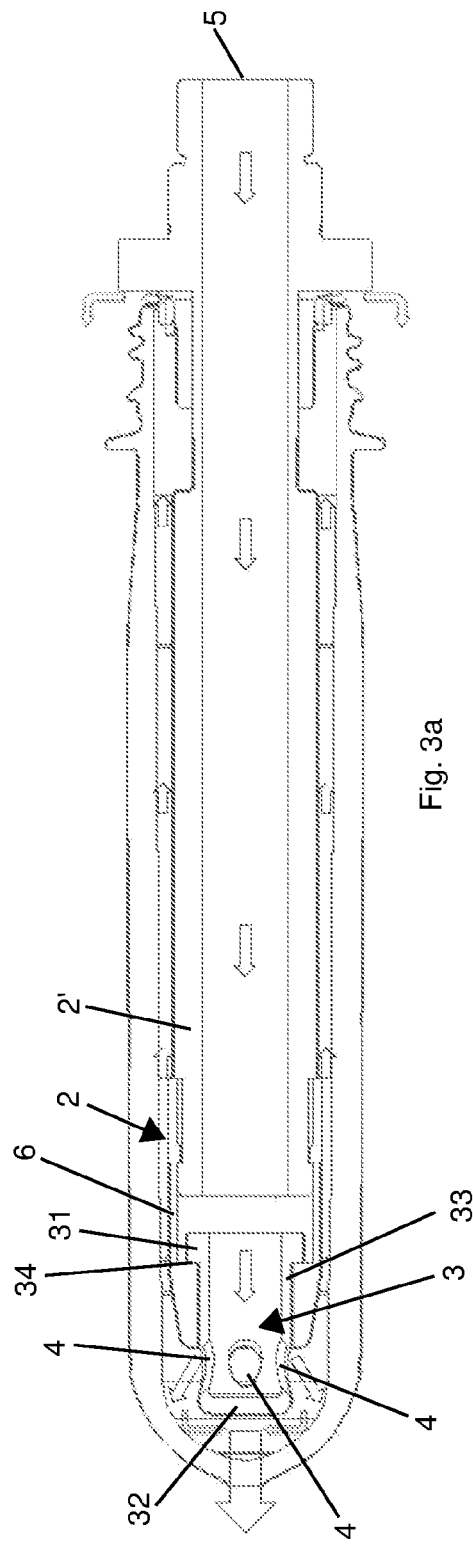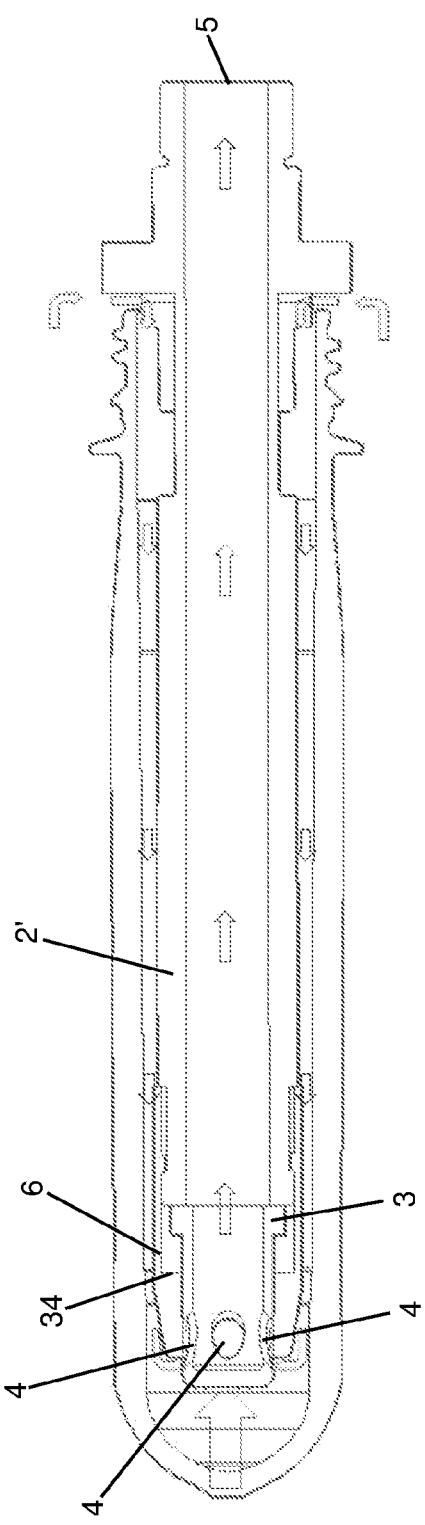

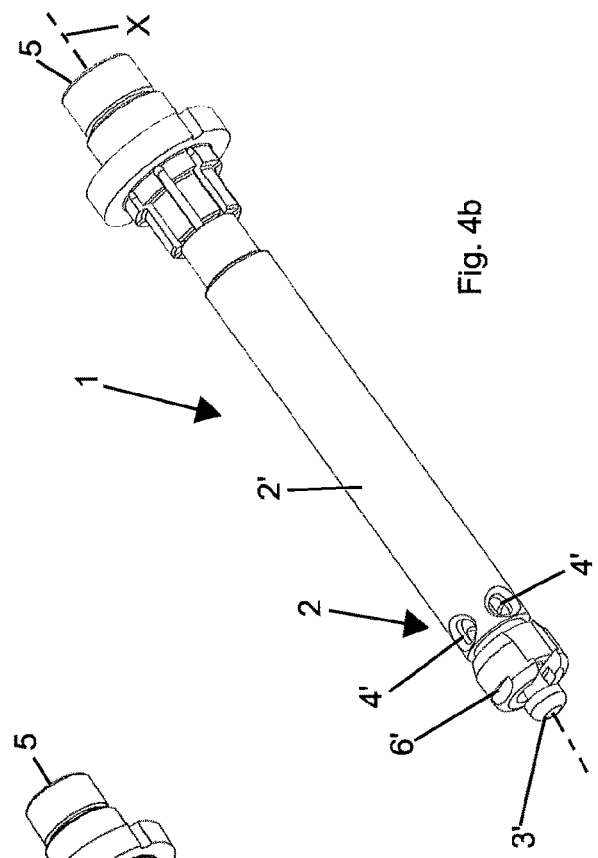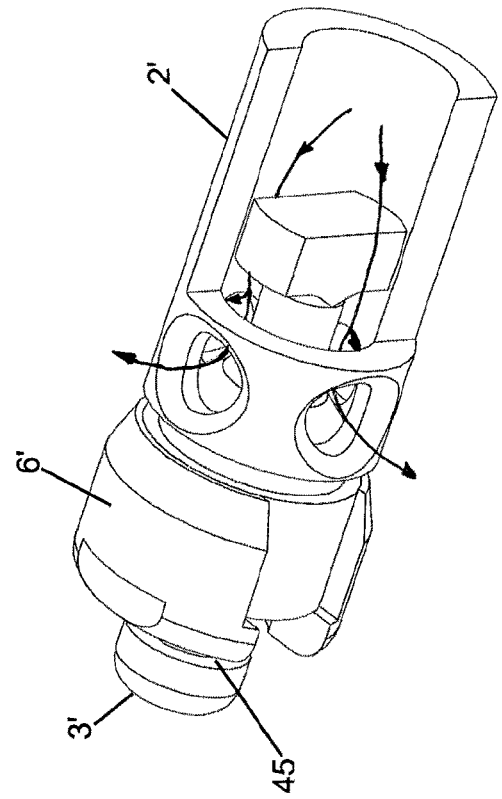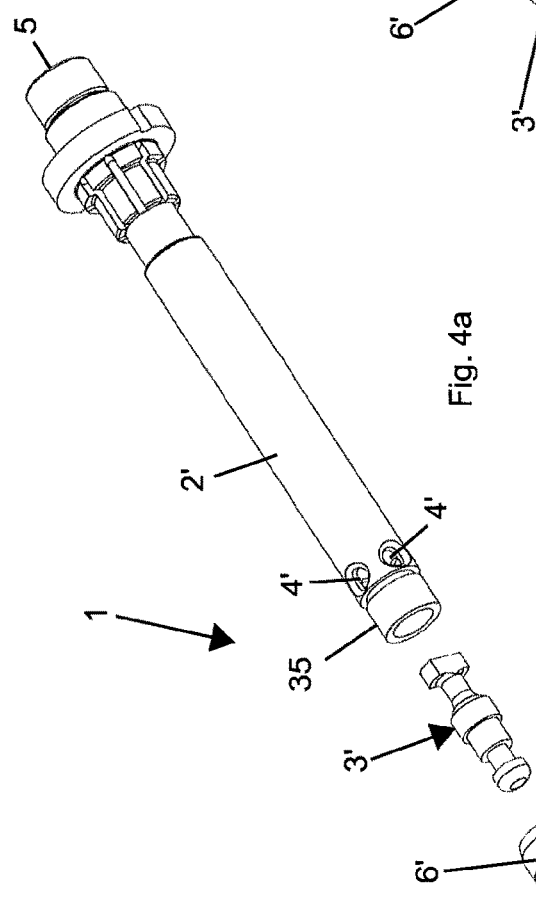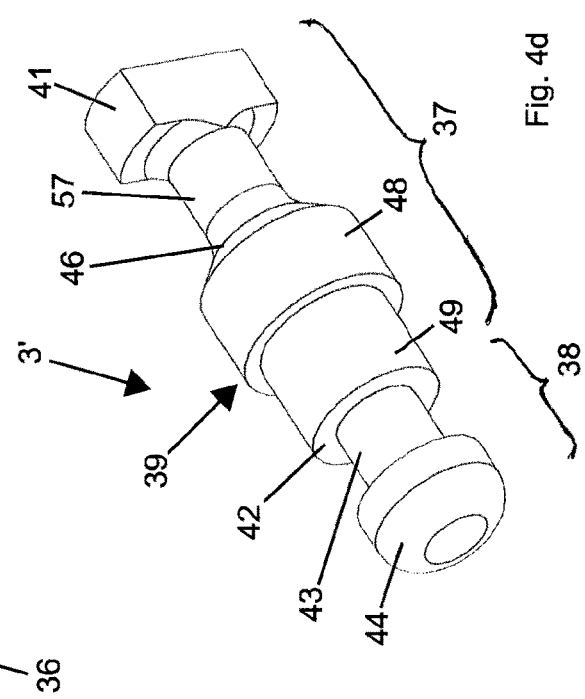

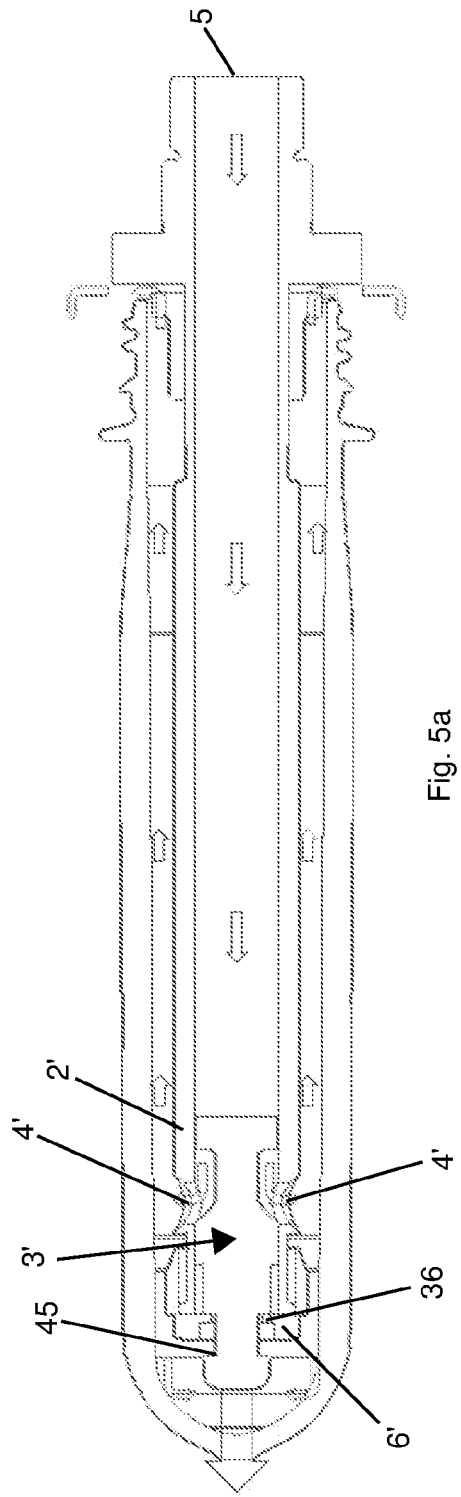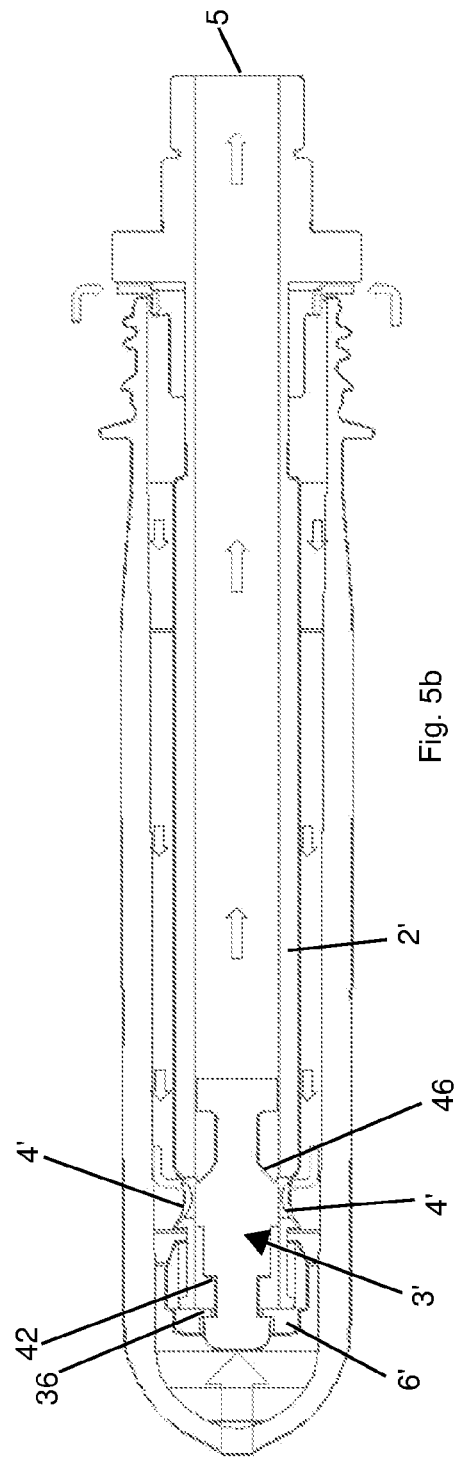

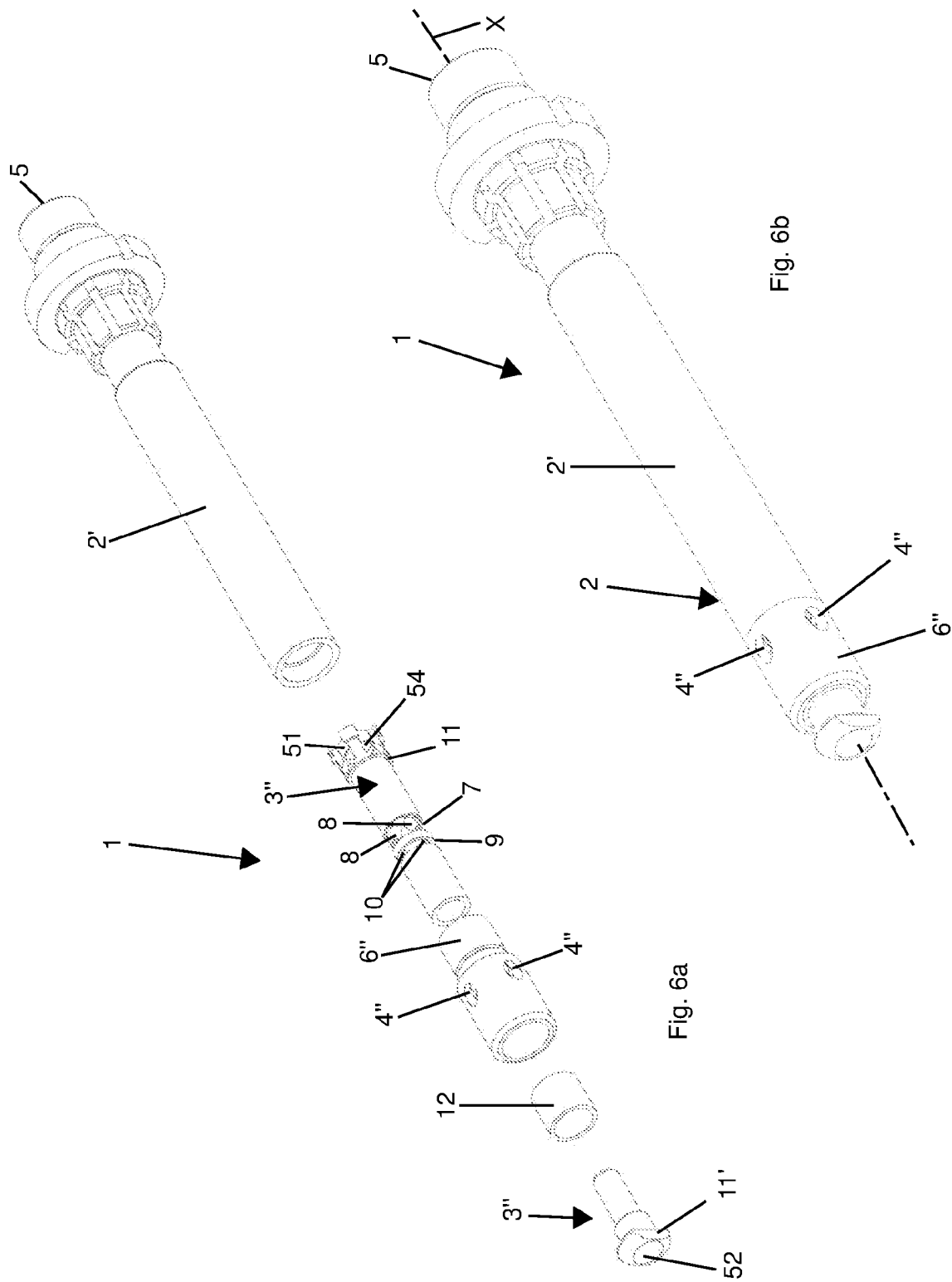

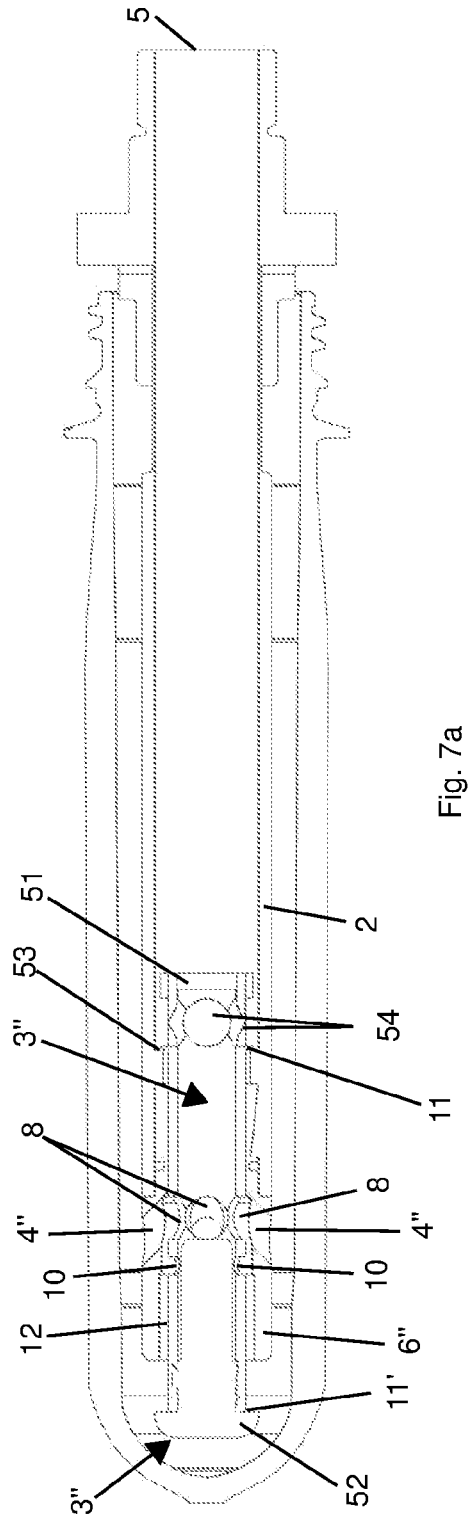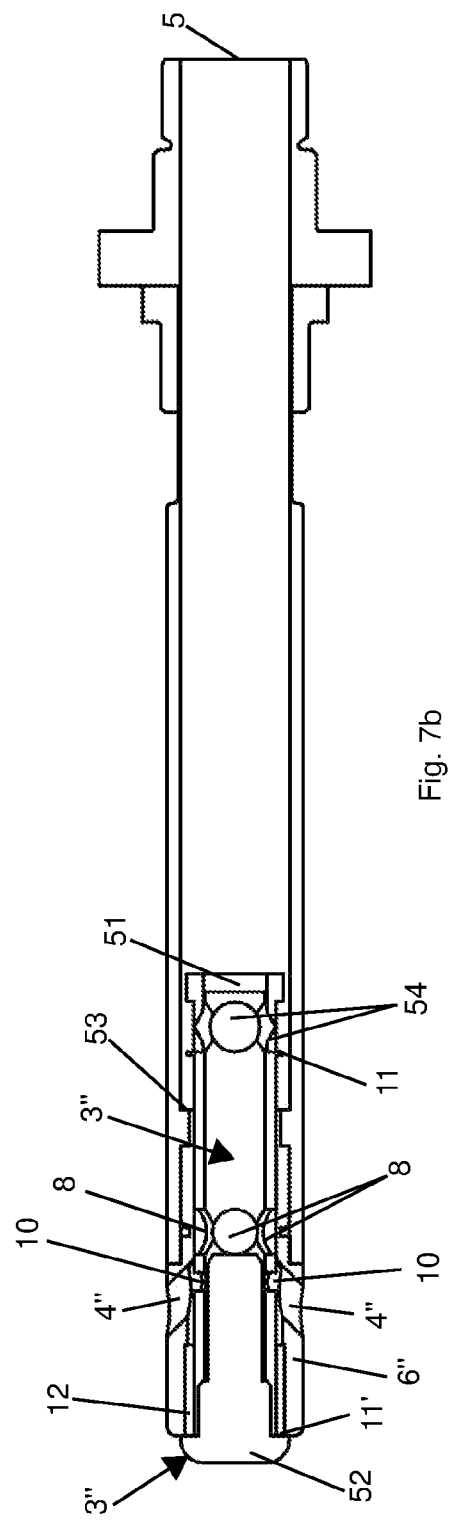

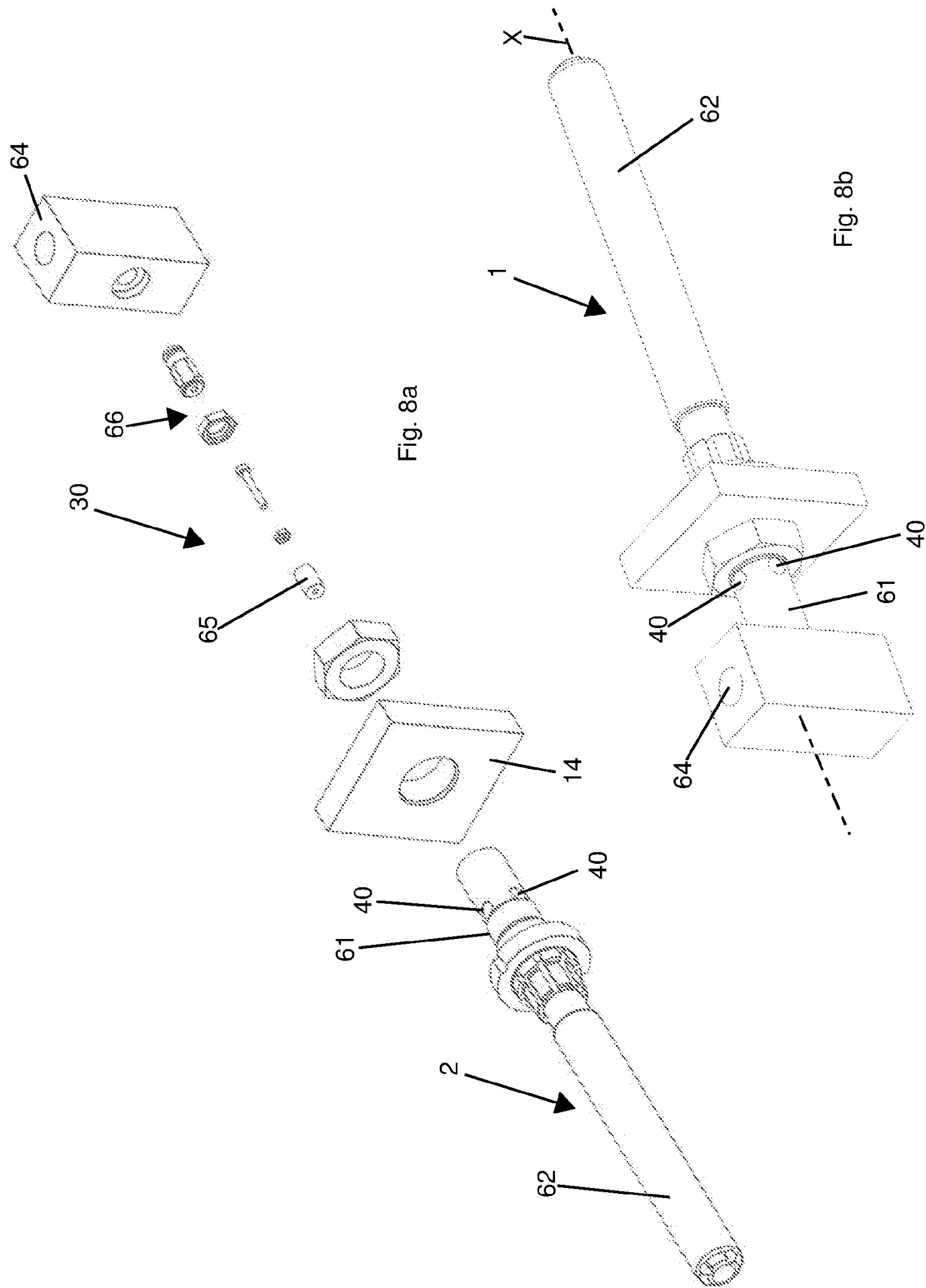

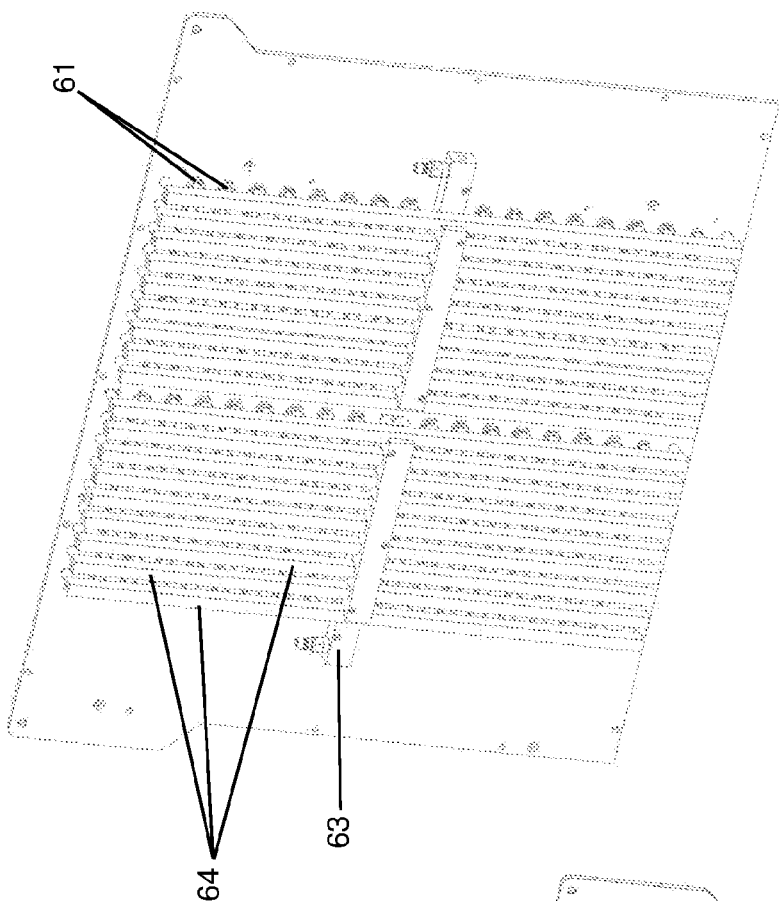
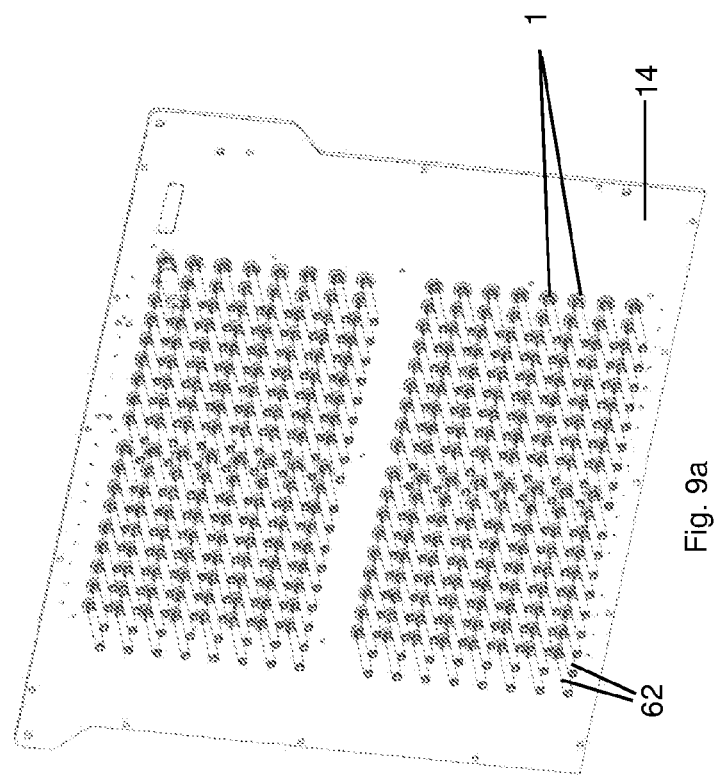
Fig. 9a
Fig. 9b

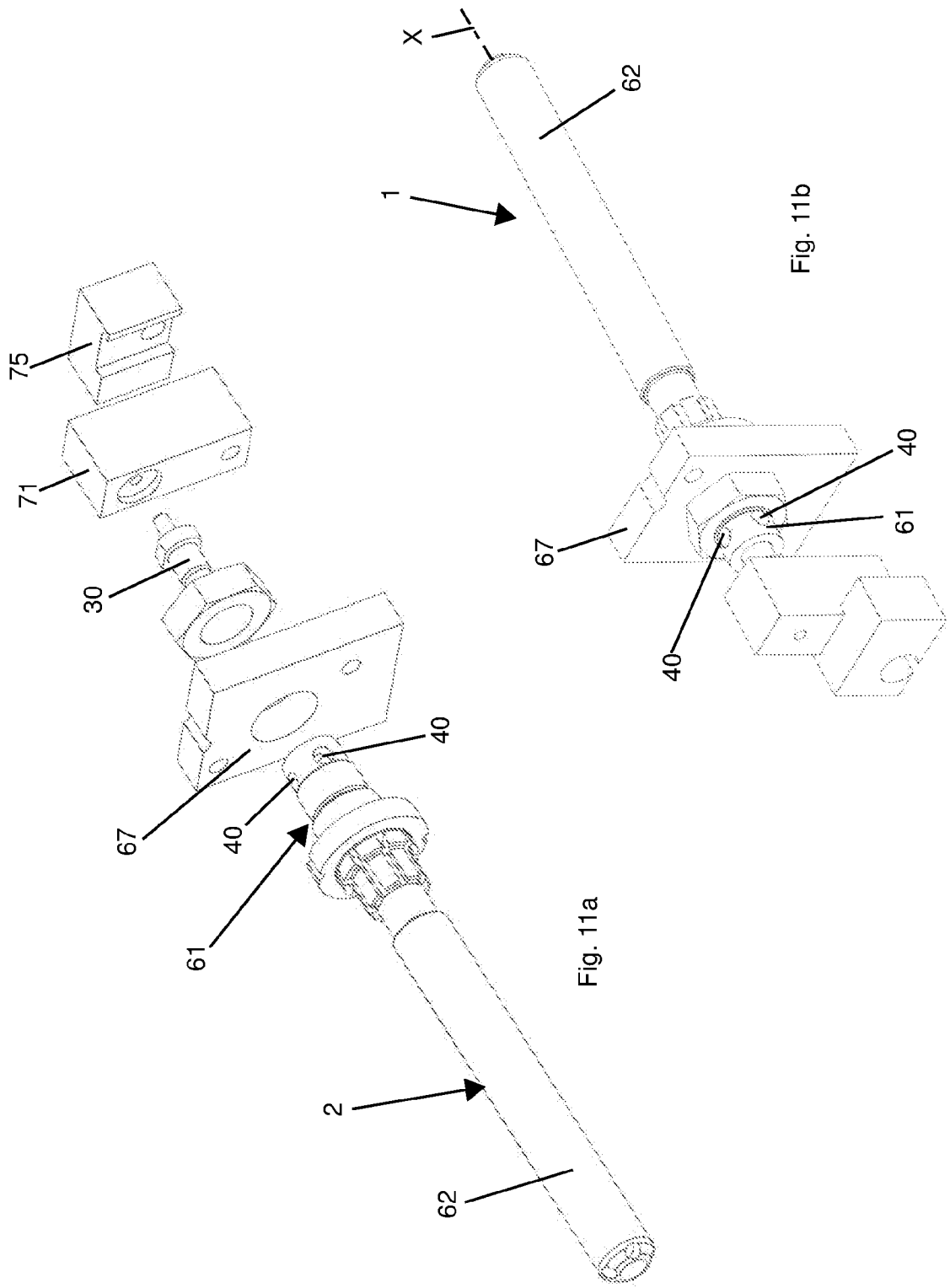

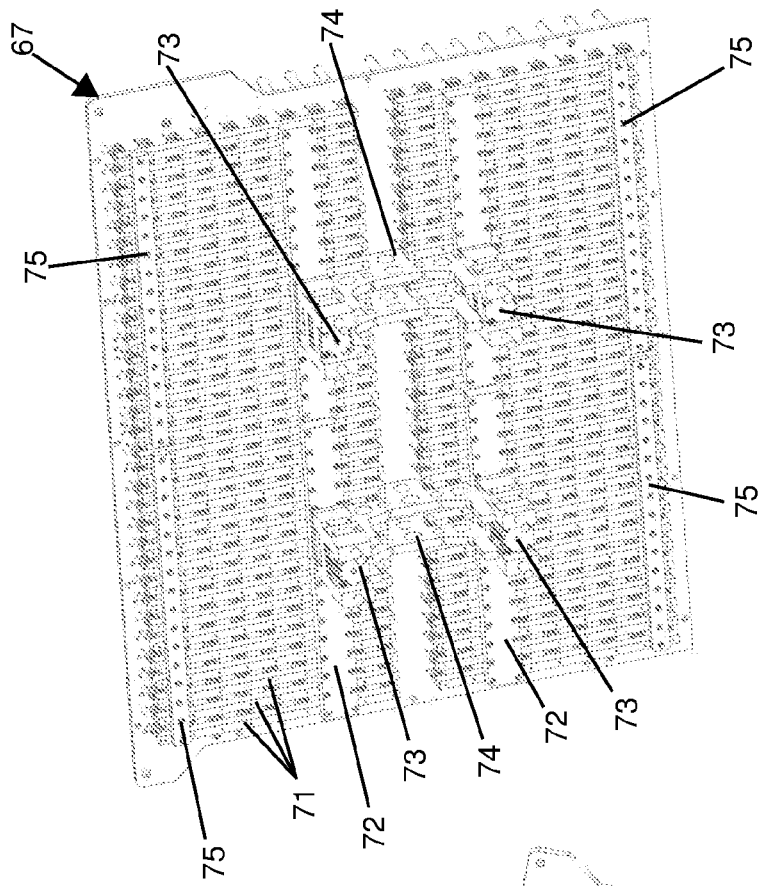
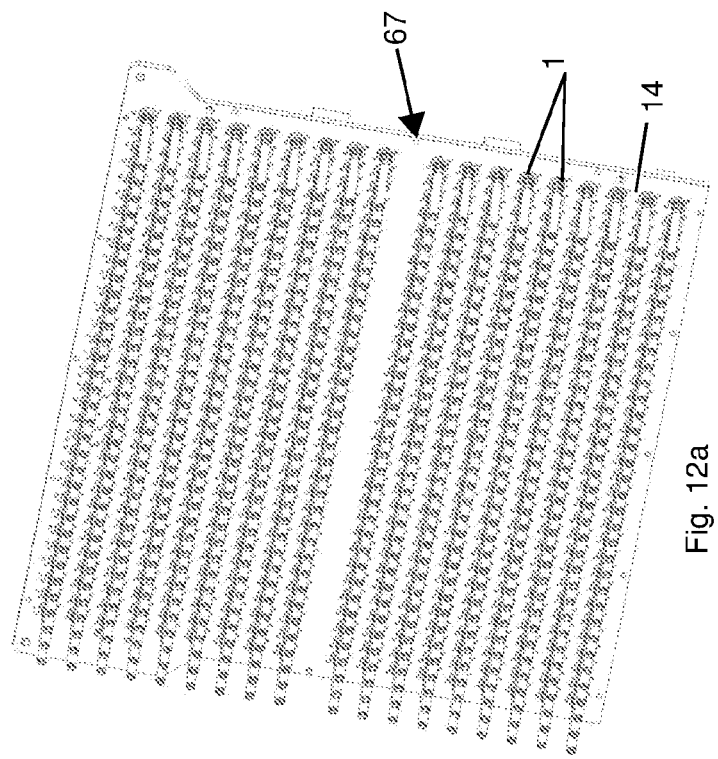
Fig. 12b
Fig. 12a

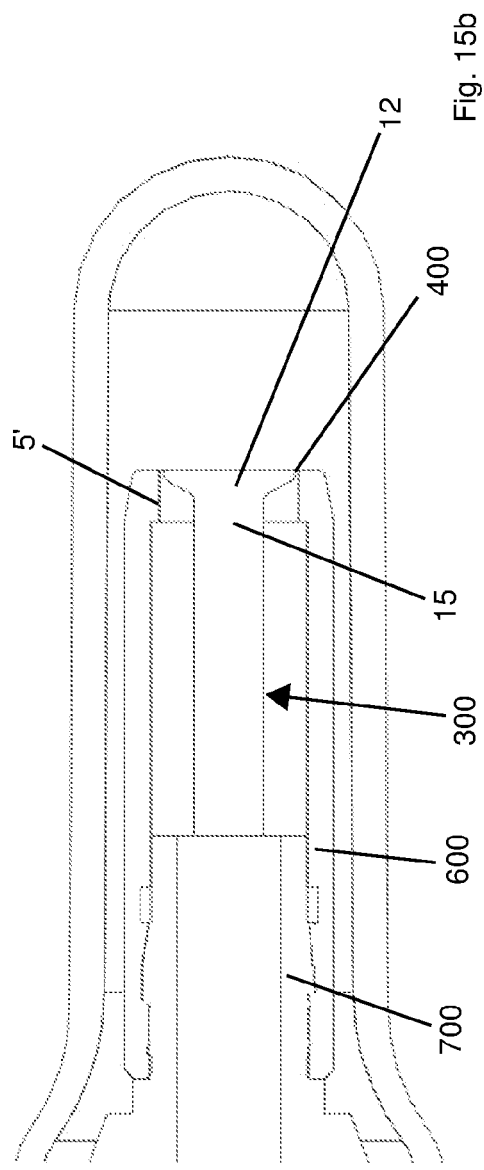
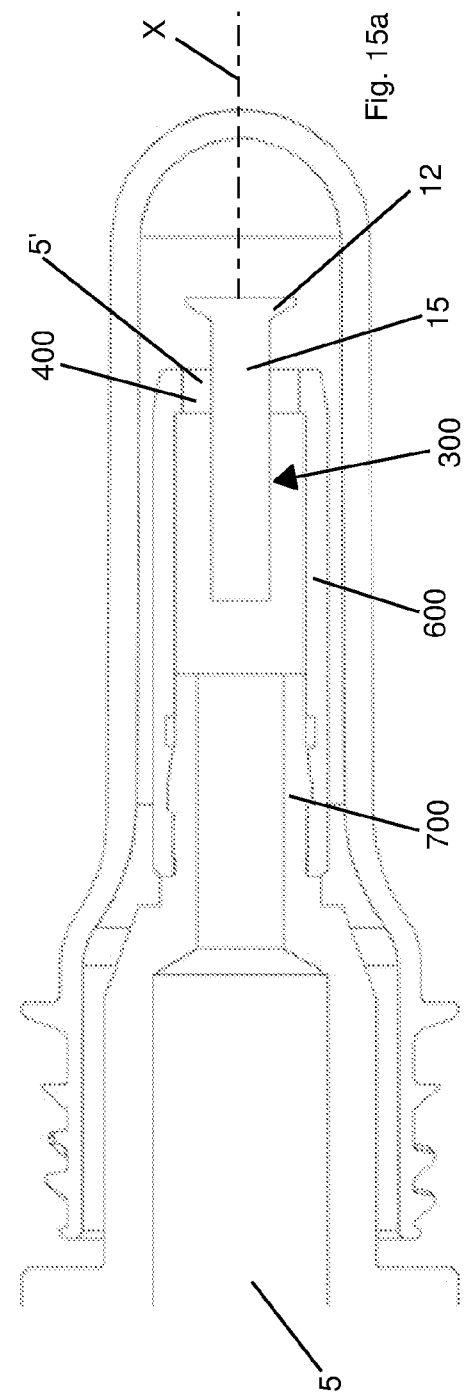

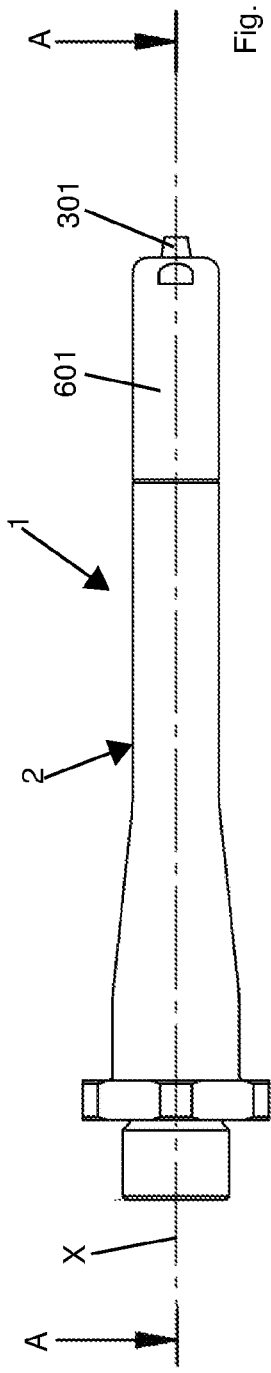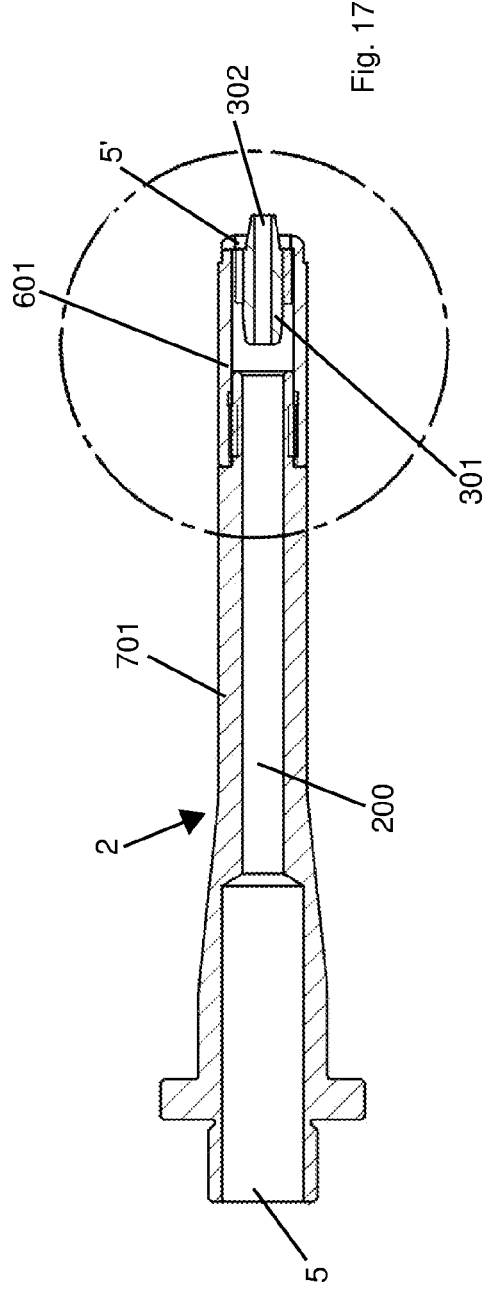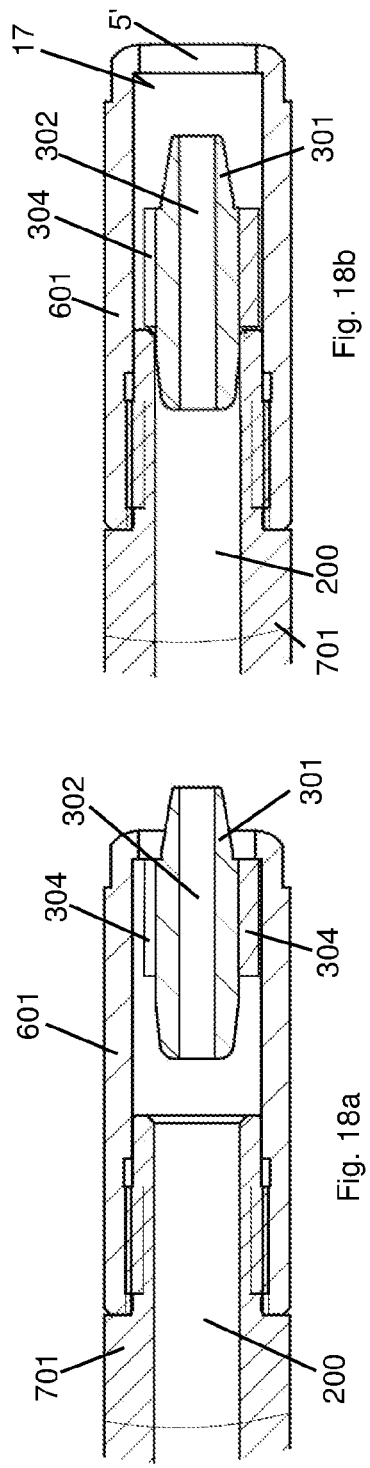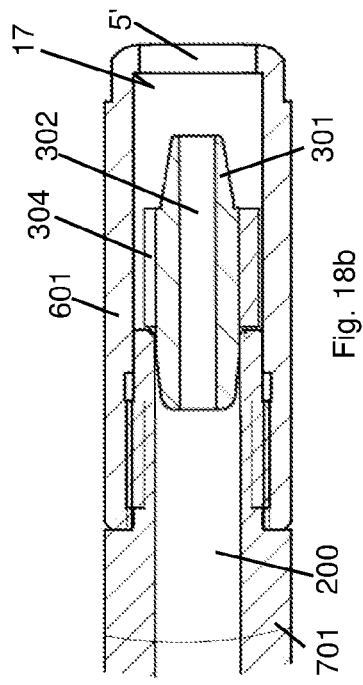

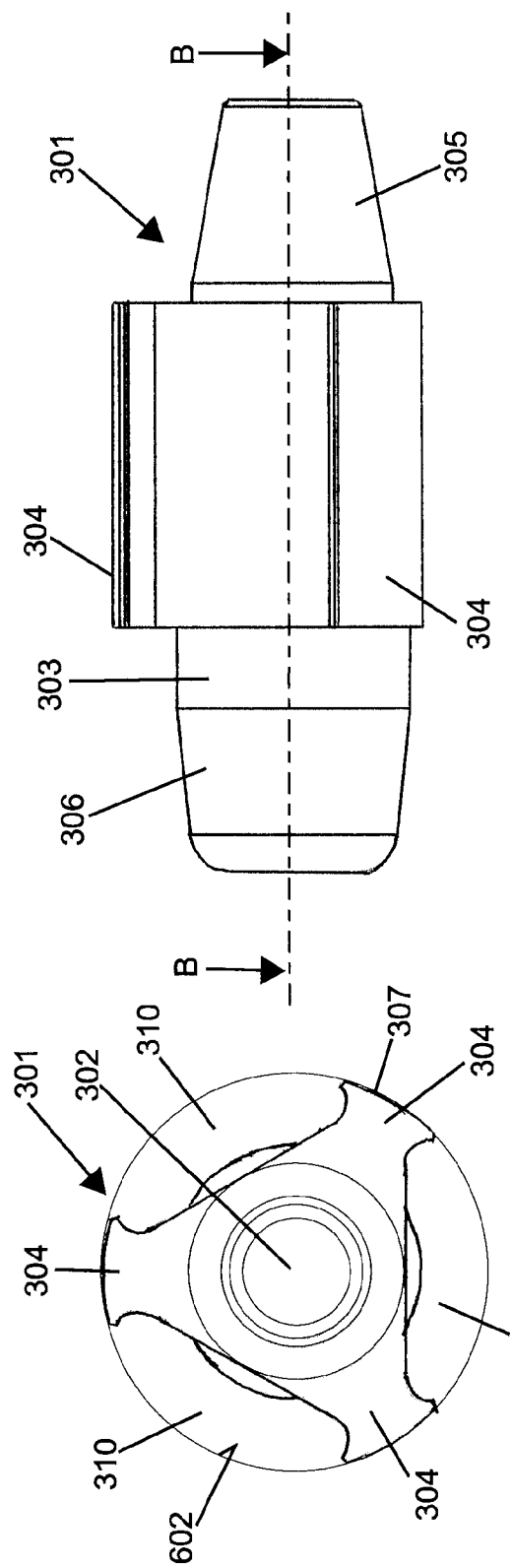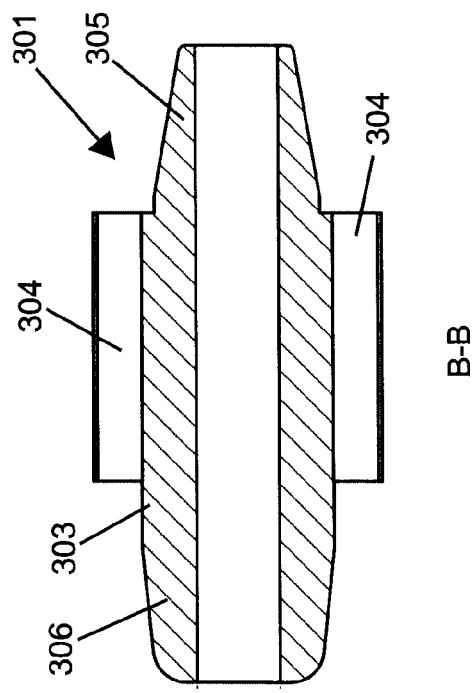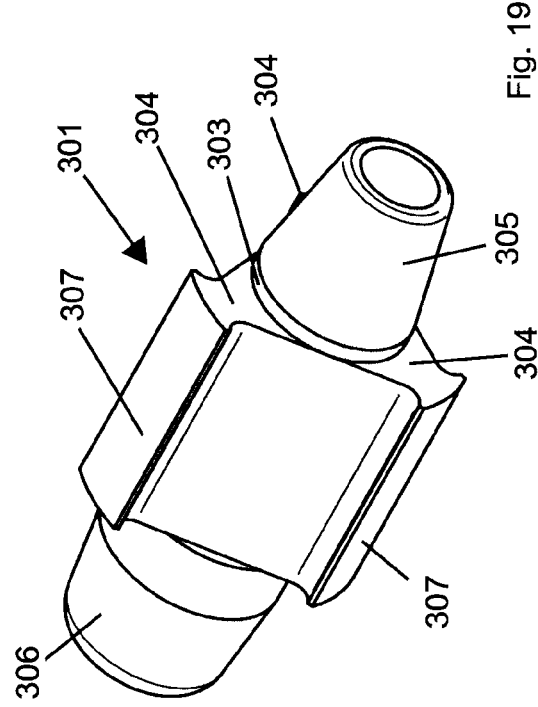

COOLING AND RETAINING PIN FOR AN APPARATUS FOR COOLING AND HANDLING PREFORMS MADE OF PLASTIC MATERIAL

CROSS REFERENCE TO RELATED APPLICATIONS

This application is a national phase of PCT application No. PCT/IB2020/057057, filed Jul. 27, 2020, which claims priority to IT patent application No. 102019000012876, filed Jul. 25, 2019, all of which are incorporated herein by reference thereto.

FIELD OF THE INVENTION

The present invention relates to a retaining and cooling nozzle or pin for use in an apparatus for cooling and handling preforms made of plastic material, in particular adapted both to complete the cooling of a preform just molded and extracted from an injection mold by means of a take-out plate or device, and to extract the cooled preform from said take-out device or from another intermediate retaining device. The preforms are intended to be then transformed into containers, in particular bottles or jars, by a blowing or stretch-blowing process. The present invention also relates to: a handling station, which includes a plurality of retaining and cooling pins and is adapted to cooperate with a plate for extracting preforms from an injection mold; a preform cooling and handling apparatus which includes said handling station; an injection molding machine which includes said apparatus; and a related process for handling and cooling preforms.

BACKGROUND ART

The preforms are semi-finished products made of thermoplastic material used for making containers, in turn obtained by a subsequent blowing or stretch-blowing process. The preforms are obtained by different processes, for example, by injection or injection-compression molding or extrusion combined with further hot forming operations. In the production of containers made of plastic material, such as, for example, bottles, the preforms are conventionally obtained by injection molding with molds provided with a plurality of molding cavities.

Generally, the step which involves the main expenditure of time in most injection molding processes is the step of cooling the molded objects. Said cooling step occurs inside the mold, and more precisely inside the molding cavities, until the molded objects are rigid enough to be extracted from the mold itself, and then handled and transported. It is apparent that, until the molded objects are sufficiently cooled down, and therefore solidified, it will not be possible to free the molding cavities and continue the production cycle with a new molding step. Therefore, to reduce the time of an entire molding cycle, and therefore increase the productivity of the molding station, various devices have been developed which are capable of carrying out at least one part of the cooling of the preforms outside the injection mold.

The systems for removing the preforms from the injection molds are currently equipped with a cooling circuit. Said cooling circuit allows decreasing the production cycle time as already described above; in fact, if the removing system is equipped with a cooling circuit, it is possible to reduce the time in which the preforms must be kept inside the injection mold. Such removing systems generally comprise a preform extraction plate, adapted to extract the preforms from the injection mold and, at the same time, to cool them for a predetermined time, and this is obtained by means of the circulation of suitable fluids inside the extraction plate itself.

Such extraction plate, also known as "post-mold device" or "take-out plate" or "end-of-arm tool" (EOAT), is provided with a plurality of cooling housings, also called tubes, but also known as "cooling tubes", "take-out tubes" or "cooling sleeves". Whatever are the method and device for extracting preforms from the injection mold, the cooling of the molded preforms, started in the molding cavities of the mold, continues in the cooling housings of the extraction plate.

Downstream of the extraction plate, at least one additional cooling and handling apparatus is provided, cooperating upstream with said extraction plate and downstream with other components of the production plant.

However, the cooling and handling apparatuses of the background art are not very efficient. Some of them use the air aspirated from the inside of the booth of the injection molding machine for further cooling. Therefore, the air used for this cooling is quite warm, usually at a temperature of 30-35° C., thus not ensuring an optimal cooling.

A known example of such apparatuses uses a rotating handling station, also known as a "rotary shell", which exclusively works on suction during both the cooling step and the step of retaining and extracting the preforms from the extraction plate. Disadvantageously, working on suction does not allow obtaining an effective cooling, due to the limited air flow rate which can be achieved using the current cooling and retaining pins. In addition, working on suction during the step of further cooling of the preforms means that the hot air of the booth is aspirated directly inside the preforms to then pass inside the "rotary shell" after having passed through the respective pin of the rotating handling station.

A further disadvantage of the current cooling and retaining pins is that they do not allow an easy extraction and handling of the preforms, in particular for heavy preforms, since the vacuum produced inside the preform, working on suction, often does not ensure an optimal grip causing some preforms to fall during the extraction and handling step.

The need is therefore felt to make a preform cooling and retaining pin which allows overcoming the aforesaid drawbacks.

SUMMARY OF THE INVENTION

It is the object of the present invention to provide a preform cooling and handling pin which allows adjusting efficiently the air flow to cool the preform and the air flow to extract and handle the preform, said pin being configured to blow air during the cooling step and aspirate air during the extraction and handling step.

It is another object of the invention to provide a cooling and handling pin capable of obtaining a high air flow rate during the blowing step, to better cool the preform, and a high vacuum inside the preform during the suction step, thus ensuring a better handling and extraction of the preforms, even for those the combination of weight and geometry of which makes said operations critical.

It is another object of the invention to provide a cooling and handling pin which allows further optimizing the preform cooling times, and therefore the injection molding cycle time, while ensuring a high quality of the preforms for a perfect molding of the blown containers.

Therefore, the present invention aims to achieve the above-mentioned objects by providing a cooling and retaining pin to cool, by air blowing, and to retain, by air suction, a preform made of plastic material, the pin comprising:

- a body, defining a longitudinal axis and having a first opening at a first end thereof, coaxial to said longitudinal axis and adapted to be connected to a handling station;
- a movable element adapted to slide at least partially inside said body;
- at least one gap for the air to pass both during the blowing step and during the suction step, provided at a second end of the body, opposite to the first end, or at said first end;
- wherein the movable element is adapted to move from a first position, corresponding to a first section for the passage of air through said at least one gap, to a second position, corresponding to a section for the passage of air through said at least one gap, said second section being smaller than said first section, so as to adjust in said first position a blowing air flow during the cooling step and in said second position a suction air flow during the step of retaining the preform.

Another aspect of the invention relates to a handling station, for handling plastic preforms and adapted to cooperate with an extraction plate adapted to extract the preforms from an injection mold, the station comprising a shell defining an internal volume communicating on one side with a plurality of cooling and retaining pins, as the pin described above, and adapted to communicate on another side with an aeraulic circuit,

- wherein the shell has at least one face provided with said plurality of cooling and retaining pins,
- wherein the first end of the body of each pin, having the first opening, is arranged inside said shell,
- and wherein the second end of the body of each pin is arranged outside said shell. Further aspects of the invention relate to an apparatus for handling and cooling plastic preforms according to claim 15, an injection molding machine according to claim 16, and a process for handling and cooling plastic preforms carried out in the aforesaid injection molding machine according to claim 17.

Advantageously, the cooling and retaining pin of the invention allows obtaining, in particular by virtue of the blowing air flow and suction air flow adjustments:

- both a more efficient cooling of the preforms, carried out by blowing, by virtue of a better heat exchange;
- and a greater efficiency also in the extraction step, carried out by suction, ensuring a suction flow rate which avoids any risk of the preforms falling once extracted from the extraction plate.

The adjustment of the blowing and suction flows is performed by moving the movable element in the two different working positions.

Advantageously, the movable element is configured to vary the geometry of the air passage section of at least one gap or at least one hole provided at one of the two ends of the pin. By varying the air passage section, the characteristic curve of the pressure drops of the aeraulic system varies, passing from a maximum passage section, during the step of blowing air inside the preform, when the movable element is in the first position, to a minimum passage section, during the step of aspirating air from the inside of the preform, when the movable element is in the second position. Thereby, a high air flow rate will be obtained during the blowing step, to better cool the preform, and a high vacuum will be obtained inside the preform during the suction step, thus ensuring a better handling and extraction of the preforms, even for those the combination of weight and geometry of which makes said operations critical.

In a first advantageous variant of the invention, at least one hole, the passage section of which must be adjusted, is provided on the movable element, or valve, itself, at the tip of the pin, i.e., at the distal end of the pin with respect to the shell of the handling station.

In a second advantageous variant of the invention, at least one hole, the passage section of which must be adjusted, is provided on said distal end of the pin, and the movable element, or valve, is provided at said distal end or tip of the pin.

In the first and second variants, the valve preferably moves inside a sleeve, fastened to the body of the pin, which acts as the end-of-stroke of the valve.

In a third advantageous variant of the invention, at least one hole, the passage section of which must be adjusted, is provided on said distal end with the pin, and the movable element, or valve, provided at said distal end or tip with the pin, is provided in a first stretch thereof with at least one first hole having a first size, and provided in a second stretch thereof with at least one second hole having a second size smaller than the first size, whereby, when the movable element is in the first position, only the at least one first hole of the valve communicates with the at least one hole of the pin, while, when the movable element is in the second position, only the at least one second hole of the valve communicates with the at least one hole of the pin. In this case, a sliding bush, inside which the movable element slides, is provided inside said distal end of the pin. Said movable element respectively has, at the ends thereof, a first end-of-stroke element, abutting against an internal shoulder of the body of the pin when the movable element is in the first position, and a second end-of-stroke element, abutting against said distal end of the pin when the movable element is in the second position.

In other advantageous variants of the invention, at least one hole, the passage section of which must be adjusted, is provided on the lateral surface of the pin head, i.e., at the proximal end of the pin with respect to the shell of the handling station. In this case, the movable element, or valve, is provided at said proximal end of the pin, thus closing the opening coaxial to the longitudinal axis.

In a further advantageous variant of the invention, only one gap is provided, coaxial to said longitudinal axis, the passage section of which must be adjusted. The movable element or valve moves from the first position, at which the gap is delimited between one smaller-size part of the movable element and an opening of the distal end or tip of the pin, to the second position, at which the gap is delimited between one greater-size end of the movable element and said opening of the tip of the pin. Said opening of the pin tip is crossed by the movable element.

In all the variants of the invention, the passage of the movable element from the first position to the second position, and vice versa, allows adjusting the air passage section for the blowing and suction steps.

The dependent claims describe particular embodiments of the invention.

BRIEF DESCRIPTION OF THE DRAWINGS

Further features and advantages of the invention will become more apparent from the detailed description of preferred, but not exclusive, embodiments of a preform cooling and retaining pin shown by way of non-limiting example, with the aid of the accompanying drawings, in which:

FIG. 1b shows a perspective view of part of the machine in FIG. 1a;

FIG. 2a shows an exploded view of a first embodiment of a pin according to the invention;

FIGS. 2b and 2c show perspective views of the pin in FIG. 2a in two operating positions;

FIGS. 3a and 3b show sectional views of the pin in FIG. 2a in two operating positions;

FIG. 4a shows an exploded view of a second embodiment of a pin according to the invention;

FIG. 4b shows a perspective view of the pin in FIG. 4a in an operating position;

FIG. 4c shows a perspective view, partially in transparency, of details of the pin in FIG. 4b;

FIG. 4d shows a perspective view of a component of the pin in FIG. 4b;

FIGS. 5a and 5b show sectional views of the pin in FIG. 4a in two operating positions;

FIG. 6a shows an exploded view of a third embodiment of a pin according to the invention;

FIG. 6b shows a perspective view of the pin in FIG. 6a in an operating position;

FIGS. 7a and 7b show sectional views of the pin in FIG. 6a in two operating positions;

FIG. 8a shows an exploded view of a fourth embodiment of a pin according to the invention;

FIG. 8b shows a perspective view of the pin in FIG. 8a in an operating position;

FIGS. 9a and 9b show a front view and a rear view, respectively, of a plate of a handling station provided with pins according to said fourth embodiment;

FIG. 11a shows an exploded view of a fifth embodiment of a pin according to the invention;

FIG. 11b shows a perspective view of the pin in FIG. 11a in an operating position;

FIGS. 12a and 12b show a front view and a rear view, respectively, of a plate of a handling station provided with pins according to said fifth embodiment;

FIGS. 15a and 15b show sectional views of the pin in FIG. 14 in two operating positions;

FIG. 16 shows a side view of a seventh embodiment of a pin according to the invention;

FIG. 17 shows a cross-sectional view along the plane A-A of the pin in FIG. 16;

FIGS. 18a and 18b show details of the pin in the section in FIG. 17 in two operating positions;

FIG. 19 shows a perspective view of a component of the pin in FIG. 17;

FIG. 20 shows a front view of the component in FIG. 19;

FIG. 21 shows a side view of the component in FIG. 19;

FIG. 22 shows a cross-sectional view along the plane B-B of the component in FIG. 21.

The same reference numerals in the Figures identify the same elements or components.

DETAILED DESCRIPTION OF PREFERRED EMBODIMENTS OF THE INVENTION

Figure 1A:
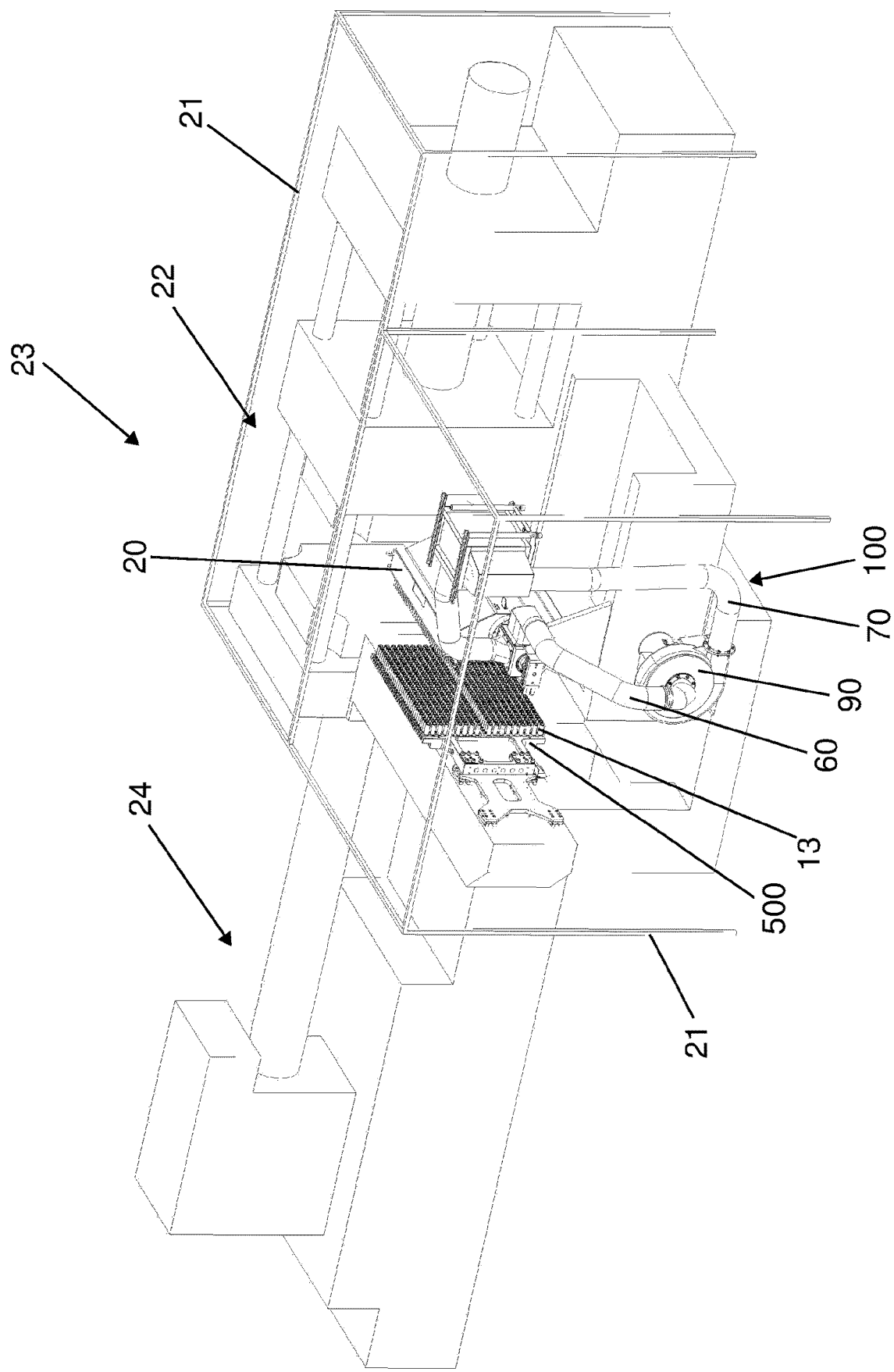
FIG. 1a shows a perspective view of an injection molding machine which includes an example of a handling station provided with a plurality of retaining and cooling pins according to the invention.

With reference to FIG. 1a an injection molding machine 23 is shown comprising a booth 21 inside which there are at least provided:

- at least one injection mold 22 comprising a plurality of molding cavities;
- an injection unit 24 for injecting molten plastic into the injection mold 22, filling said molding cavities;
- at least one extraction plate 500 comprising at least one set of cooling housings 13, for receiving and retaining at least one set of preforms extracting said preforms from the molding cavities in a known manner; said cooling housings 13 being configured to carry out a first cooling of the preforms after the extraction from the mold;
- and a handling and cooling apparatus 100.

The cooling housings 13, having a substantially tubular shape or, in any case, a hollow shape, are fastened on a suitable frame or casing for supporting the extraction plate 500, aligned according to two spatial directions, and arranged in rows and columns so as to form a matrix. Inside each cooling housing 13 a seat is obtained with a geometry which reproduces the shape of the external surface of the preform. Inside each seat, through an insertion opening, a preform to be cooled can be introduced.

The space inside the frame and the cooling housings 13 is crossed by a cooling fluid, for example, water and/or air, so as to cool the preforms inserted in said housings. A plurality of inner channels, both inside the extraction plate and the housings, allows the cooling fluid to follow a suitable path so as to lap and cool the various tubular bodies of the cooling housings.

Figure 1B:
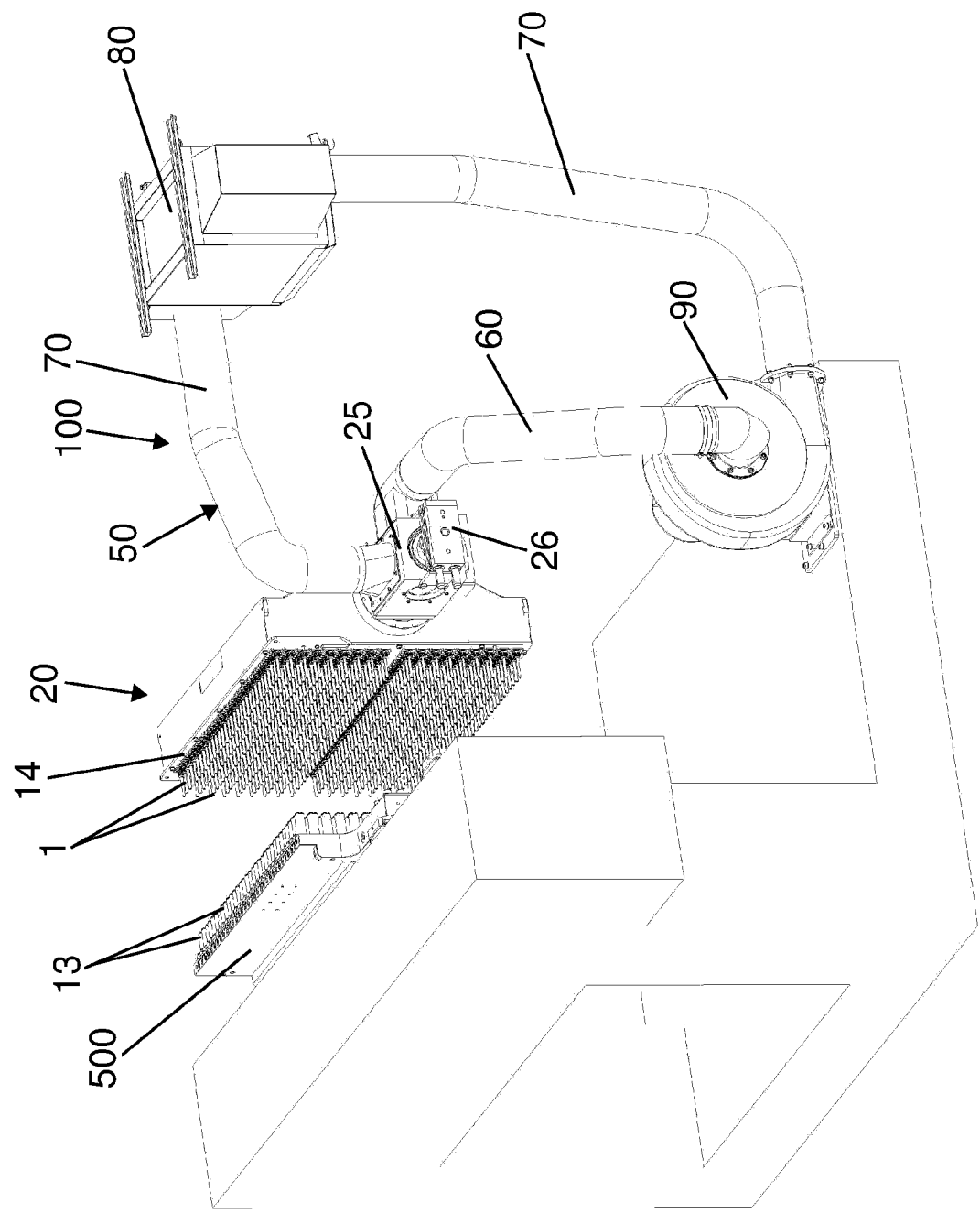

With reference to FIG. 1b, there is shown the cooling and handling apparatus 100 for cooling and handling preforms intended for the production of containers, in particular bottles, made of thermoplastic material such as, for example, PET (Polyethylene Terephthalate), PEN (Polyethylene Naphthalate), PP (Polypropylene), PLA (Polylactide or Polylactic Acid) or other further and suitable material, as well as mixtures thereof, by subsequently blowing or stretch-blowing molding preheated preforms.

Such preform cooling and handling apparatus 100 comprises:

- a handling station 20, of the rotary type or exclusively linear movement type, provided on at least one face 14 thereof with a plurality of nozzles or pins 1 for cooling and retaining the preforms, and adapted to cooperate with the extraction plate 500;
- an aeraulic circuit 50 connected to the handling station 20.

Similarly to the cooling housings 13 in the extraction plate 500, also the cooling and retaining pins 1 are correspondingly fastened on the face 14 of the handling station 20, aligned according to two spatial directions, and arranged in rows and columns so to form a matrix.

Said pins 1 communicate with an internal volume of the handling station 20, delimited by a shell and, in turn, in communication with the aeraulic circuit 50.

The aeraulic circuit 50 comprises:

- a suction duct 60 to aspirate air from the internal volume of the handling station 20,
- a delivery duct 70 to send air to said internal volume;
- and suction means 90 connected to the suction duct 60 and to the delivery duct 70.

The internal volume of the handling station 20 is defined by a single volume or space, communicating on one side with the aeraulic circuit 50 and on the other side with all the pins 1. On the side of the aeraulic circuit 50, the air can only be introduced in said single volume by means of the delivery duct 70, which is outside the handling station 20, with a consequent air blowing through all the pins 1; or the air can only be aspirated from said single volume by means of the suction duct 60, which also is outside the handling station 20, this aspiration causing the air to pass from all pins 1 to the internal volume.

Advantageously, there are provided cooling means, for example a heat exchanger 80, arranged along the delivery duct 70 to cool the air sent to the handling station 20.

Switching means of the aeraulic circuit are provided, to pass from a first circuit configuration, in which there is a passage of air from the delivery duct 70 to the inside of the handling station 20, to a second circuit configuration, in which there is a passage of air from the inside of the handling station 20 to the suction duct 60, whereby air can be blown through all the pins of the plurality of retaining and cooling pins 1 in the first circuit configuration, while air can be aspirated through all the pins of said plurality of pins 1 in the second circuit configuration.

Said switching means of the aeraulic circuit comprise at least one valve 25 and actuation means 26 adapted to actuate said at least one valve.

The actuation means 26 which actuate the at least one valve 25 are independent of the actuation means (not shown) which actuate the rotation or the translation of the handling station 20, allowing the selection of the blowing mode or suction mode irrespective of the position and movement of the handling station 20.

The handling station 20 is configured, in turn, to pass from a loading position for cooperating with the extraction plate 500 to an unloading position for releasing the preforms from said cooling and retaining pins 1.

In the loading position the face 14 is arranged parallel to the extraction plate 500 and the cooling and retaining pins 1 are adapted to cooperate with respective cooling housings 13. By approaching the extraction plate 500 and the face 14, the pins 1 are inserted into the preforms arranged in the cooling housings 13 to carry out, during an air blowing step when the aeraulic circuit is in the first circuit configuration, a second cooling of the preforms, and then to retain and extract the preforms from said cooling housings 13 during an air suction step when the aeraulic circuit is in the second circuit configuration.

The suction means 90 are adapted to aspirate air from the internal environment of the booth 21 in the first circuit configuration, while they are adapted to aspirate air from the inside of the handling station 20 in the second circuit configuration.

In an alternative not shown, the suction duct 60 and the delivery duct 70 are not communicating and first suction means are provided at one end of the suction duct 60 and second suction means are provided at one end of the delivery duct 70, said ends being distal from the handling station 20. In particular, the first suction means can consist of a first fan or blower configured to aspirate air from the internal environment of the booth 21 when the valve 25 is in a first position, while it is adapted to aspirate air from the inside of the handling station 20 when the valve 25 is in a second position. The second suction means can consist of a second fan or blower, configured to aspirate air from the internal environment of the booth 21 to send said air to the delivery duct 70, and then to the handling station 20 when the valve 25 is in the first position or again to the internal environment of the booth 21 after cooling the air aspirated by means of the cooling means 80.

Advantageously, all the embodiments of the cooling and retaining pin 1 comprise:

- a body 2, defining a longitudinal axis and having, at a first end thereof, a first opening (5), coaxial to said longitudinal axis and adapted to be connected to a handling station 20;
- a movable element 3, 3', 3", 30, 300, 301 adapted to slide at least partially inside the body 2;
- at least one gap or opening for a passage of air, provided at a second end of the body 2 or at said first end;
- wherein the movable element 3, 3', 3", 30, 300, 301 can move from a first position, corresponding to a first section for the passage of air through said gap, to a second position, corresponding to a second section for the passage of air through said gap, the second section being smaller than the first section, so as to adjust the blowing air flow during the preform cooling step and the suction air flow during the step of retaining the preform.

In the embodiments shown from FIG. 2*a* to FIG. 13*b*, said at least one gap is at least one hole provided at the second end or at the first end of the body 2.

In particular, only one hole or at least two holes 4, 4', 4", 40 are provided, arranged along a circumference, coaxial to the longitudinal axis X. The movable element 3, 3', 3", 30 moves from the first position, or blowing position, which corresponds to a first air passage section for said only one hole or for each hole, to the second position or suction position, which corresponds to a second air passage section for said only one hole or for each hole, which is smaller than the first section, so as to adjust the flow of air which is blown or aspirated through said only one hole or said at least two holes 4, 4', 4", 40. In all embodiments, in the case of a single hole, the latter is substantially annular slit shaped, i.e., the hole is a curvilinear hole arranged along a circumference, coaxial to the axis of the body 2, but the curvilinear axis of which does not complete the circumference.

A first embodiment of the cooling and retaining pin according to the invention, shown in FIGS. 2*a* to 3*b*, provides for a single hole or at least two holes 4 being obtained on the movable element 3, arranged at the second end of the body 2, i.e., at the tip of the pin. In particular, the single hole or the at least two holes 4 are obtained in the lateral surface of the movable element 3.

In the example shown, four holes 4 are provided, each hole 4 preferably defining an axis inclined with an angle other than zero with respect to the longitudinal axis of body 2. The number of holes 4 can be less or even greater than four.

In particular, the body 2 of the pin comprises a first tubular portion 2', or main portion, comprising the opening 5 of the first end connected to the handling station 20. The second end of the body 2, opposite to the first end, is provided with a second tubular portion 6, in the form of a sleeve, which defines an end-of-stroke element delimiting, therein, the stroke of the movable element 3 from the second position to the first position. The second tubular portion or sleeve 6 is fastened on one end of the first tubular portion 2, distal from the opening 5.

In the example shown (FIGS. 3*a* and 3*b*) the movable element 3, preferably of a substantially cylindrical hollow shape, has:

a first end 31, proximal to the first portion 2' and inside the sleeve 6, said first end being open and communicating with the cavity of the first tubular portion 2';

a second end 32, distal from the first portion 2' and outside the sleeve 6, said second end being closed to prevent, in the event of blowing, that the flow of air directly hits the bottom of the preform;

a central part 33, between the first end 31 and the second end 32, provided with holes 4 proximal to said second end 32 and arranged along a circumference, coaxial to the longitudinal axis of the body 2.

Advantageously, the first end 31 defines a shoulder of the movable element 3 adapted to abut against an internal shoulder 34 (FIGS. 3a, 3b) of the sleeve 6, which acts as the end-of-stroke.

During an air blowing from the opening 5 towards the second end of the body 2, the movable element 3 is in the first position (FIGS. 2c and 3a), or advanced position, with the holes 4 mainly placed outside the body 2, preferably completely outside the sleeve 6. In this advanced position the shoulder of the movable element 3 abuts against the internal shoulder 34 of the sleeve 6.

When the configuration of the aeraulic circuit 50 changes, the air suction from the holes 4 towards the opening 5 of the body 2 pushes the movable element 3 to the second position (FIGS. 2b and 3b), or retracted position, with the holes 4 mainly placed inside the body 2, i.e., almost completely inside the sleeve 6. In this retracted position, the first end 31 of the movable element 3 abuts against the first tubular portion 2' of the body 2.

By changing the aeraulic circuit configuration 50 again, the air blowing from the opening 5 of the body 2 towards the holes 4 pushes the movable element 3 to the first position (FIGS. 2c and 3a).

As clearly shown in the Figures, during the step of cooling the preform, by blowing air through pin 1 (FIG. 3a), the air passage section through the holes 4 is maximum, not being obstructed or being minimally obstructed by the sleeve 6. This allows an effective cooling of the preform. On the other hand, during the step of retaining the preform, by aspirating air through the pin 1 (FIG. 3b), the air passage section through the holes 4 is minimal, being largely, but only partially, obstructed by the sleeve 6. This allows producing a greater vacuum, thus making the extraction of the preform, from the respective cooling housing 13 of the extraction plate 500, and the retention thereof on the handling station 20 effective.

A second embodiment of the cooling and retaining pin according to the invention, shown in FIGS. 4a to 5b, provides for a single hole or at least two holes 4' being produced on the second end of the body 2, or the tip of the pin. In particular, the single hole or the at least two holes 4' are obtained in the lateral surface of the second end of the body 2.

In the example shown, four holes 4' are provided, each hole 4' preferably defining an axis inclined with an angle other than zero with respect to the longitudinal axis of body 2. The number of holes 4' can be less or even greater than four.

In particular, the body 2 of the pin comprises a first tubular portion 2', or main portion, comprising the opening 5 of the first end of the body 2, connected to the handling station 20.

The second end of the body 2, opposite to the first end, is provided with the aforesaid holes 4', arranged along a circumference, coaxial to the longitudinal axis of the body 2, at one end 35 of the first tubular portion 2', distal from the opening 5. Said second end of the body 2 comprises a second tubular portion 6', in the form of a sleeve, which defines an end-of-stroke element delimiting, therein, the stroke of the movable element 3' from the second position to the first position, and vice versa. The second tubular portion or sleeve 6' is fastened on said end 35 of the first tubular portion 2', in an outermost position with respect to the position of the holes 4' along the longitudinal axis of the body 2.

In the example shown (FIGS. 4c, 4d, 5a and 5b) the movable element 3' is slidable inside the body 2 at the second end of the body 2 and comprises:

a first portion 37, proximal to the holes 4' and completely inside to the first tubular portion 2';

and a second portion 38, distal from the holes 4', and at least partially outside said first tubular portion 2'.

The first portion 37 comprises a first end 39, adjacent to the second portion 38, a central part 57 and a second end 41, distal from the second portion 38. The second portion 38 comprises a first stretch 43, adjacent to the first end 39 of the first portion 37, and a second stretch 44 distal from said first end 39.

The first end 39 of the first portion 37 is substantially cylindrical and has a greater diameter than the first stretch 43 of the second portion 38 so as to define a shoulder 42 of the movable element 3' adapted to abut against a first internal shoulder of the sleeve 6', defined by an internal protuberance 36 thereof, when the movable element 3' passes from the second position (FIG. 5b) to the first position (FIG. 5a). 5a).

The second stretch 44 of the second portion 38 also has a diameter greater than the first stretch 43, so as to define a shoulder 45 of the movable element 3' adapted to abut against a second internal shoulder of the sleeve 6', defined by the aforesaid internal protuberance 36, on a face opposite to the one which forms the first internal shoulder, when the movable element 3' passes from the first position (FIG. 5a) to the second position (FIG. 5b).

The first end 39 of the first portion 37 has a greater diameter than the central part 57, also preferably cylindrical.

The diameter of the first end 39 is such as to allow said first end 39 to slide on the internal surface of part of the first tubular portion 2', in particular on the part comprising the holes 4'.

A connecting stretch 46 can be provided between the first end 39 and the central part 57.

The second end 41 of the first portion 37 preferably has a greater size than the central part 57.

Preferably, but not necessarily, the second end 41 has a larger diameter than the central part 57. Furthermore, the external lateral surface of the second end 41 is shaped so as to have two curved surfaces joined by two flat surfaces. Such curved surfaces are substantially two opposite portions of a cylinder coaxial to the tubular portion 2'.

More in detail, the second end 41 is in the shape of a cylinder coaxial and internal to the tubular portion 2', said cylinder being cut by at least one plane parallel to the longitudinal axis of the body 2 and not containing the aforesaid longitudinal axis. In the example in FIG. 4d, the second end 41 is in the shape of a cylinder cut by two planes parallel to each other and to the longitudinal axis of the body 2, defining a hammer shape with the central part 57. The diameter of the cylindrical lateral portions of the second end 41 can be equal to the diameter of the first end 39. Many other shapes can be designed for said second end 41, provided that they allow the air to pass from the opening 5 towards the holes 4', and vice versa, and allow the air to push the movable element 3' from the first position to the second position, or vice versa.

Optionally, the first end 39 can have a diameter reduction between a stretch 48, adjacent to the central part 57, and a stretch 49 adjacent to the stretch 43 of the second portion 38 of the movable element 3'.

Advantageously, during the step of cooling the preform, by blowing air through the pin 1 (FIG. 5*a*) from the opening 5 towards the second end of the body 2, the movable element 3' is in the first position (FIGS. 4*c* and 5*a*), or advanced position, and the air passage section through the holes 4' is maximum, not being obstructed or being minimally obstructed by a stretch of the movable element 3' having a diameter such as to slide on the internal surface of the first tubular portion 2'. This allows an effective cooling of the preform. Preferably said stretch of the movable element 3', which can minimally obstruct the passage section, is the end 39 of the first portion 37 of the movable element 3', or the stretch 48 of the end 39.

When changing the configuration of the aeraulic circuit 50, for retaining the preform by air suction through the pin 1 (FIG. 5*b*), the air suction from the holes 4' towards the opening 5 of the body 2 pushes the movable element 3' to the second position (FIG. 5*b*), or retracted position, and the air passage section through the holes 4' is minimal, being largely obstructed by a stretch of the movable element 3'. Preferably, such stretch is the end 39 or the stretch 48 of the first portion 37, having a diameter such as to slide on the internal surface of the first tubular portion 2'. This allows producing a greater vacuum, thus making the extraction of the preform from the respective cooling housing 13 of the extraction plate 500 and the retention thereof on the handling station 20 effective.

By changing the aeraulic circuit configuration 50 again, the air blowing from the opening 5 of the body 2 towards the holes 4' pushes the movable element 3' to the first position (FIG. 5*a*).

A third embodiment of the cooling and retaining pin according to the invention, shown in FIGS. 6*a* to 7*b*, provides for a single hole or at least two holes 4" being obtained on the second end of the body 2, i.e., the tip of the pin. In particular, the single hole or the at least two holes 4" are obtained in the lateral surface of the second end of the body 2.

In the example shown, four holes 4" are provided, each hole 4" preferably defining an axis inclined with an angle other than zero with respect to the longitudinal axis of body 2. The number of holes 4" can be less or even greater than four.

In particular, the body 2 of the pin comprises a first tubular portion 2', or main portion, comprising the opening 5 of the first end of the body 2, connected to the handling station 20.

The second end of the body 2, opposite to the first end, comprises a second tubular portion 6", in the form of a sleeve, fastened on said first tubular portion 2'. The holes 4" are obtained on the second tubular portion 6", along a circumference coaxial to the longitudinal axis of the body 2.

The movable element 3" is arranged at the second end of the body 2, passes through the second tubular portion 6" and can also partially slide inside the first tubular portion 2'.

Optionally, the second tubular portion, or sleeve 6", is internally provided with a sliding bush 12, in a longitudinally outermost position than the position of the holes 4", preferably at the end of the sleeve 6" distal from the opening 5. The movable element 3" can slide inside the sliding bush 12.

The movable element 3" is preferably of a substantially cylindrical shape, at least partially hollow.

Advantageously, a hollow part of the movable element 3" is provided, in a first stretch 7 thereof, with first holes 8, in a number equal to that of the holes 4", having a first size (e.g., first diameter), and is provided, at a second stretch 9 thereof, with second holes 10, in a number equal to that of the holes 4", having a second size (e.g., second diameter) smaller than the first size. Both the first holes 8 and the second holes 10 are arranged along a respective circumference, coaxial to the longitudinal axis of the body 2. Preferably the first holes 8 have a diameter equal to or greater than that of the holes 4", while the second holes 10 have a diameter smaller than that of the holes 4". Alternatively, the first holes 8 can have a diameter smaller than that of the holes 4" but however greater than that of the second holes 10.

A first end 51 of the movable element 3" is provided with an external radial shoulder or protrusion defining a first end-of-stroke element 11 which abuts against an internal shoulder 53 of the body 2, for example of the tubular portion 2' or of the tubular portion 6", when the movable element 3" is in the first position or blowing position.

A second end 52 of the movable element 3", which is part of a solid (non-hollow) part of the movable element 3", is provided with a shoulder defining a second end-of-stroke element 11' which abuts against the second end of the body 2, i.e., against the tubular portion 6", when the movable element 3" is in the second position or suction position.

The dimensioning of the movable element 3" is such that in the first position (FIG. 7*a*) only the first holes 8 are at respective holes 4", while in the second position (FIG. 7*b*) only the second holes 10 are at the respective holes 4".

Advantageously, therefore, during the step of cooling the preform, by blowing air through the pin 1 (FIG. 7*a*) from the opening 5 towards the second end of the body 2, the movable element 3" is in the first position (FIG. 7*a*), or advanced position, and the air passage section through the holes 4' is maximum, since the latter communicate with the first holes 8 of the movable element 3". The air coming from the opening 5 passes through the tubular portion 2', enters the movable element 3" and passes through the holes 8 and the holes 4" to reach the inside of the preform. This allows an effective cooling of the preform.

When changing the configuration of the aeraulic circuit 50, for retaining the preform by air suction through the pin 1 (FIG. 7*b*), the air suction from the holes 4" towards the opening 5 of the body 2 pushes the movable element 3" to the second position (FIG. 5*b*), or retracted position, and the air passage section through the holes 4" is minimal, since the latter communicate with the second holes 10 of the movable element 3", smaller than the first holes 8. This allows producing a greater vacuum, thus making the extraction of the preform from the respective cooling housing 13 of the extraction plate 500 and the retention thereof on the handling station 20 effective.

By changing the aeraulic circuit configuration 50 again, the air blowing from the opening 5 of the body 2 towards the holes 4" pushes the movable element 3" to the first position (FIG. 5*a*).

The movable element 3" is solid (non-hollow) at the second end 52 thereof so that the air, during the blowing step, cannot exit longitudinally along the second end of the body 2 but is deflected laterally towards the holes 4".

The first end 51 of the movable element 3" has a closed bottom along a plane transverse, preferably orthogonal, to the longitudinal axis of the body 2 and has at least one hole, for example at least two holes 54, on the lateral surface, arranged along a circumference coaxial to the longitudinal axis of the body 2. Thereby, the suction air will push the closed bottom of the first end 51 towards the opening 5, moving the movable element 3" in the second position, and the air will pass in the tubular portion 2' through the holes 54; while the blowing air will push the closed bottom towards the holes 4", moving the movable element 3" in the second position, and the air will pass inside the movable element 3" through said holes 54.

Many other shapes can be designed for the first end 51 of the movable element 3", provided that they allow the air to pass from the opening 5 towards the holes 4', or vice versa, and allow the air to push the movable element 3" from the first position to the second position, or vice versa.

In the case of a single hole 4" on the second tubular portion 6", a respective single first hole 8 is provided in the stretch 7 and a respective single second hole 10 is provided in the stretch 9 of the movable element 3".

A fourth embodiment of the cooling and retaining pin according to the invention, shown in FIGS. 8a to 10b, provides for a single hole or at least two holes 40 being obtained on the first end of the body 2, i.e., the head portion of the pin 1, along a circumference coaxial to the longitudinal axis of the body 2. In particular, the single hole or the at least two holes 40 are obtained in the lateral surface of the first end of the body 2.

In the example shown, four holes 40 are provided, each hole 40 defining an axis inclined by an angle other than zero with respect to the longitudinal axis of body 2. The number of holes 40 can be less or even greater than four.

The body 2 of the pin comprises a first end 61, which comprises the opening 5 of the body 2 and is adapted to be connected to the handling station 20. In particular, the first end 61 is adapted to be arranged inside the shell of the handling station 20. A second end 62 of the body 2 is adapted to be arranged outside said shell. In said second end 62, at least one further single hole or at least two further holes 40' are provided, in the example four further holes 40', arranged along a circumference coaxial to said longitudinal axis; each further hole 40' defining an axis inclined by an angle other than zero with respect to the longitudinal axis of the body 2. The second end 62 has a closed bottom, transverse to said longitudinal axis, and the holes 40' are arranged in proximity of said closed bottom, preferably in a chamfered area provided between said closed bottom and a cylindrical stretch of the second end 62. Actuation means are provided in the internal volume of the shell, adapted to actuate the movable element 30, which closes the opening 5, to pass from the first position or retracted position (FIG. 10a), which corresponds to a first air passage section for each hole 40 for an air blowing from the holes 40 towards the second end 62 of the body 2, to the second position or advanced position (FIG. 10b), which corresponds to a second air passage section for each hole 40 for an air suction from said second end 62, and therefore from the holes 40', towards holes 40.

Figure 10A:
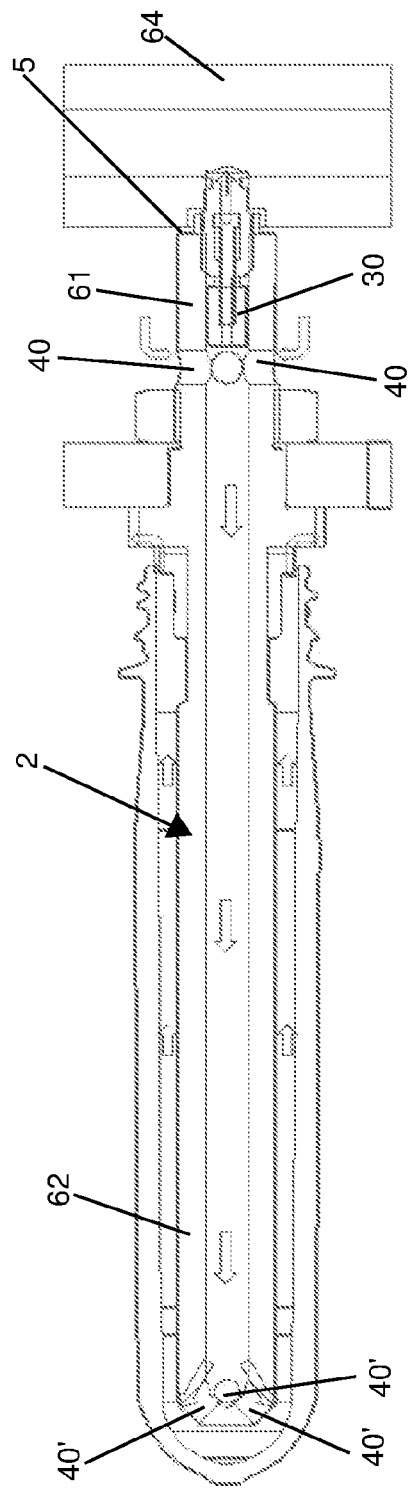
FIGS. 10a and 10b show sectional views of the pin in FIG. 8a in two operating positions.
Figure 10B:
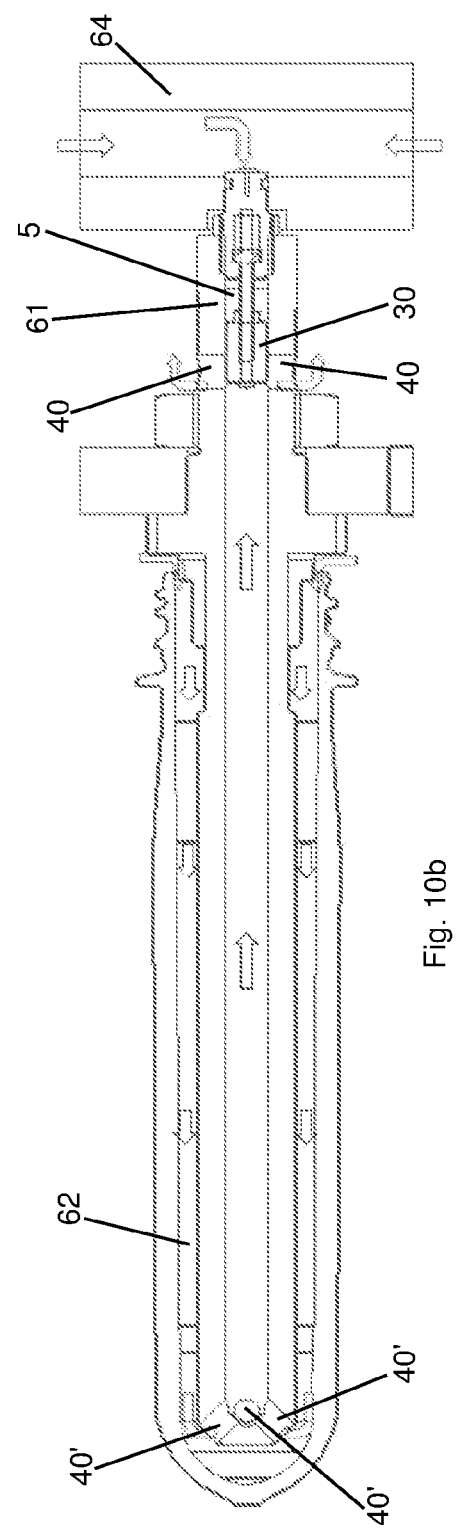

In an advantageous variant of the handling station 20 (FIG. 9b), a pneumatic circuit is provided which comprises inside the shell at least one first distribution manifold 63, for example a single distribution manifold 63, which conveys compressed air from an appropriate source (not shown) and distributes it on a plurality of second distribution manifolds 64, transverse, for example orthogonal, to the first distribution manifold 63. Each second distribution manifold 64 can in turn actuate, by means of compressed air, a plurality of actuation means, each actuation means being adapted to move a movable element 30 of a respective pin, to pass from the first position (FIG. 10a) to the second position (FIG. 10b). For example, each second distribution manifold 64 corresponds to a row of preform cooling and retaining pins of the handling station 20.

In this embodiment, exclusively by way of explanation, the movable element 30 comprises a cap 65 fastened to the stem of a piston of a micro-cylinder 66, which represents the relative actuation means. For example, columns of micro-cylinders 66 are connected to respective second distribution manifolds 64.

Advantageously, during the step of cooling the preform, by blowing air through the pin 1 (FIG. 10a) from the holes 40 towards the second end of the body 2, compressed air does not circulate in the second distribution manifolds 64 and the movable element 30 is in the first position (FIG. 10a), or retracted position, and the air passage section through the holes 40 is maximum, not being obstructed or being minimally obstructed by the movable element 30. The air, fed by the aeraulic circuit 50 inside the shell, passes through the holes 40, the tubular body 2 and comes out of the holes 40' reaching the inside of the preform. This allows an effective cooling of the preform.

When changing the configuration of the aeraulic circuit 50, for the step of retaining the preform by air suction through the pin 1 (FIG. 10b), compressed air circulates in the second distributor manifolds 64, and pushes and holds the movable element 30 to/in the second position (FIG. 10b), or advanced position, and the air passage section through the holes 40 is minimal, being largely obstructed by the movable element 30. The air, aspirated from inside the preform, passes through the holes 40', the tubular body 2 and comes out of the holes 40, with a reduced section, reaching the inside of the shell. This allows producing a greater vacuum, thus making the extraction of the preform from the respective cooling housing 13 of the extraction plate 500 and the retention thereof on the handling station 20 effective. By changing the aeraulic circuit configuration 50 again, compressed air no longer circulates in the second distribution manifolds 64 and the movable element 30 returns to the first position (FIG. 10a).

A fifth embodiment of the cooling and retaining pin according to the invention, shown in FIGS. 11a to 13b, differs from the aforesaid fourth embodiment for the movable element and for the actuation means thereof belonging to the handling station 20. The movable element 30 can be a cap, which closes the opening 5 of the first end 61 of the body 2, moved by a moving structure actuated by pneumatic actuators. In an advantageous variant of the handling station 20, a structure for moving the caps 30 is provided comprising a plurality of cap supports 71, each support 71 supporting a series of caps, for example a column or a half-column of caps corresponding to a column or half-column of pins 1 of the matrix provided in the handling station 20.

The plurality of supports 71 is moved by at least one movement bracket 72, transverse to the supports 71 and in turn moved by at least one pneumatic actuator 73.

In the example in FIG. 12b, the plate 67 of the handling station, on which the pins 1 are fastened, is divided into four equal areas, two upper areas and two lower areas.

In each area, a movement bracket 72 is provided to move a respective plurality of supports 71, each support 71 supporting a half-column of caps.

Between each upper area and the underlying lower area of the plate 67, there is provided a fastening bracket 74, fastened to the plate 67, which supports at least two pneumatic actuators 73, each pneumatic actuator 73 being adapted to move a respective movement bracket 72.

In each area, at least one connection crosspiece 75 can be optionally provided to help hold the supports 71 integral to one another during the movement.

Advantageously, during the step of cooling the preform, by blowing air through the pin 1 (FIG. 13a) from the holes 40 towards the second end of the body 2, the movable element 30, for example in the form of a cap, is in the first position (FIG. 13a), or retracted position, and the air passage section for the air to pass through the holes 40 is maximum, not being obstructed or being minimally obstructed by the movable element 30. The air, fed by the aeraulic circuit 50 inside the shell, passes through the holes 40, the tubular body 2 and comes out of the holes 40' reaching the inside of the preform. This allows an effective cooling of the preform.

When changing the configuration of the aeraulic circuit 50, for the step of retaining the preform by air suction through the pin 1 (FIG. 13b), the pneumatic actuators 73 move the movement brackets 72 in a first direction, and therefore advance the respective supports 71 which push and hold the movable elements 30 to/in the second position (FIG. 13b), where the air passage section through the holes 40 is minimal, being largely blocked by the movable element 30. The air, aspirated from inside the preform, passes through the holes 40', the tubular body 2 and comes out of the holes 40, with a reduced section, reaching the inside of the shell. This allows producing a greater vacuum, thus making the extraction of the preform from the respective cooling housing 13 of the extraction plate 500 and the retention thereof on the handling station 20 effective.

Figure 13A:
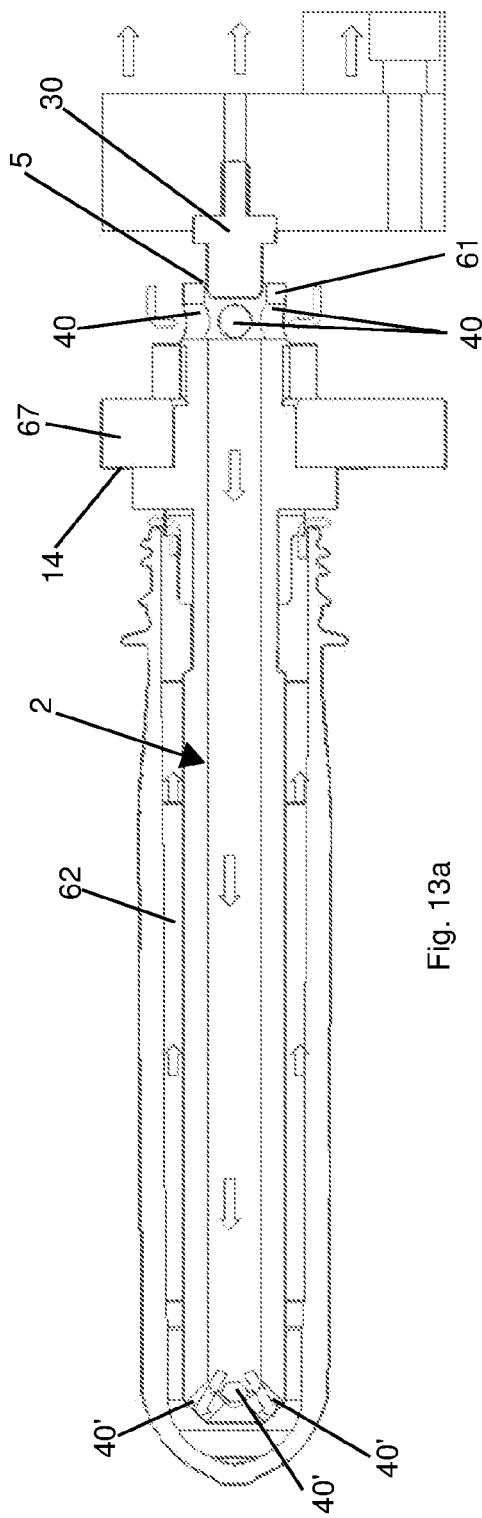
FIGS. 13a and 13b show sectional views of the pin in FIG. 11a in two operating positions.
Figure 13B:
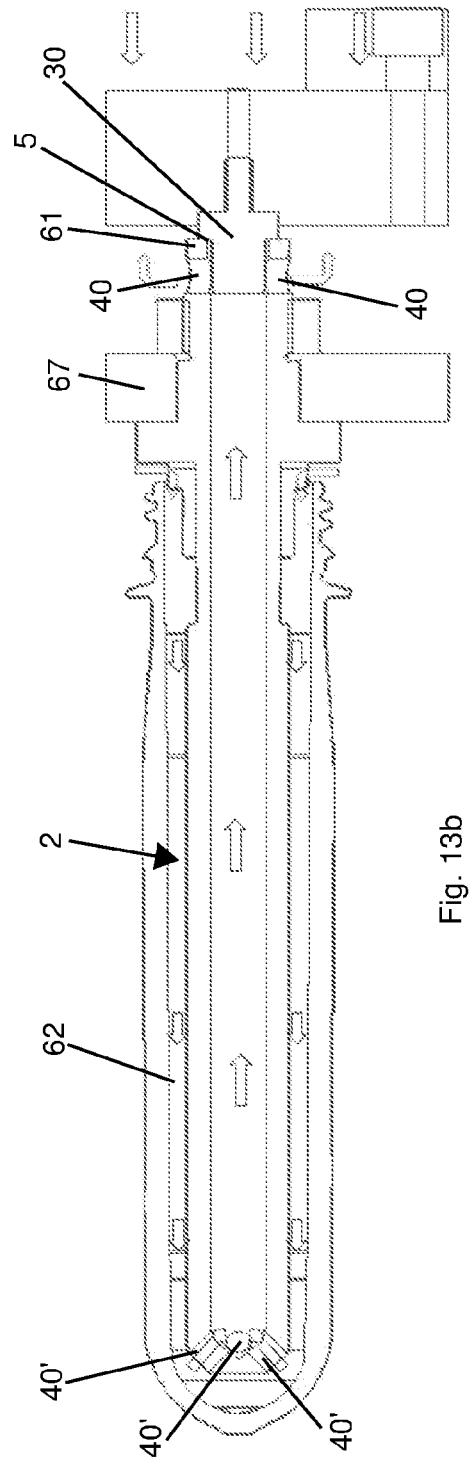

By changing the aeraulic circuit configuration 50 again, the pneumatic actuators 73 move the movement brackets 72 in a second direction, opposite to the first one, and then retract the respective supports 71, which retract and hold the movable elements 30 in the first position (FIG. 13a).

Figure 14:
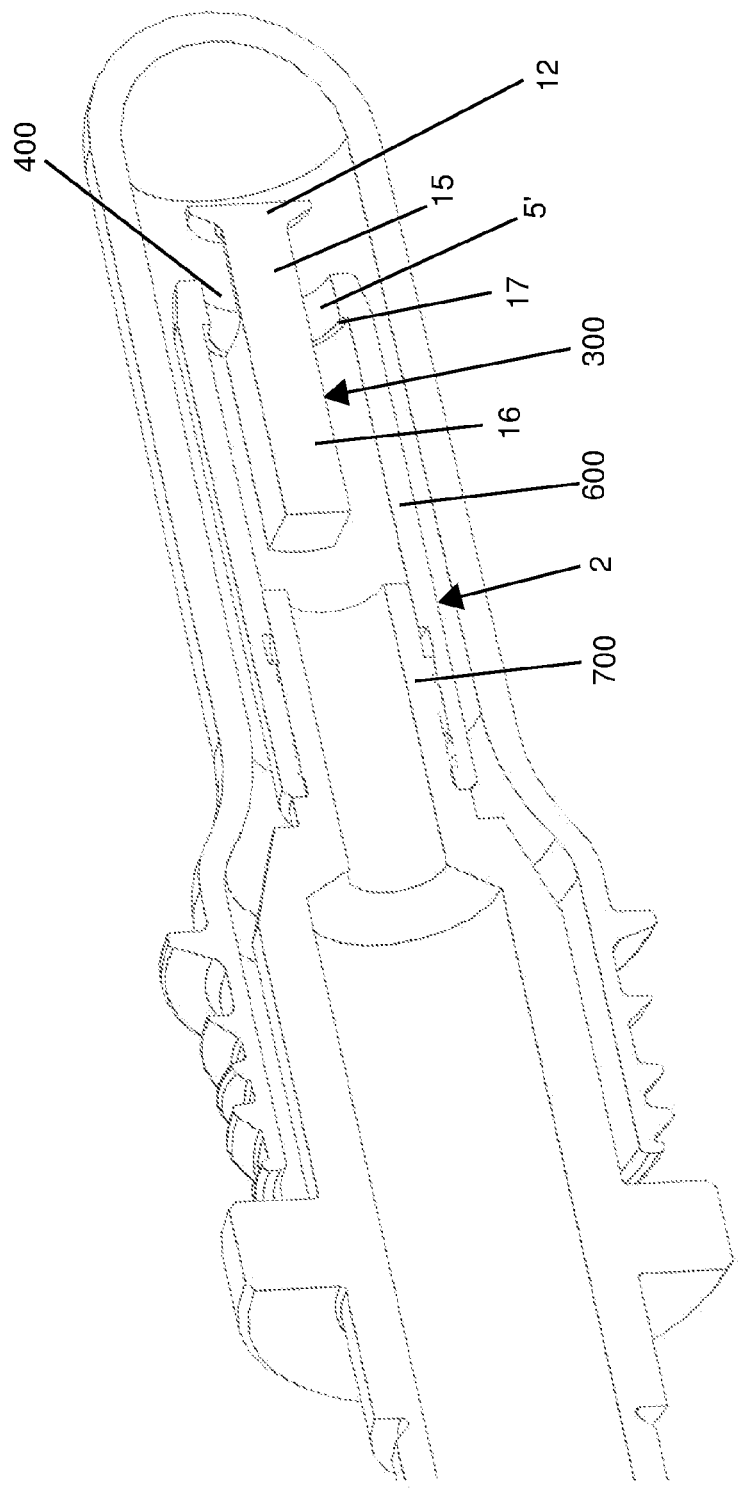
FIG. 14 shows a sectional perspective view of a sixth embodiment of a pin according to the invention.

In the sixth embodiment shown in FIGS. 14, 15a and 15b, only one gap 400 is provided at the second end of the body 2, i.e., the tip area of the pin. The movable element 300 can slide inside the body 2, along the longitudinal axis of the latter, at said second end. The single gap 400, annular in shape and coaxial to said longitudinal axis, is between an internal surface of the body 2 and an external surface of the movable element 300.

In particular, the body 2 of the pin includes a first tubular portion 700, comprising the opening 5 of the first end of the body 2 and is connected to the handling station 20. The second end of the body 2, opposite to the first end, is provided with a second tubular portion 600, in the form of a sleeve, which defines an end-of-stroke element delimiting, therein, the stroke of the movable element 300 from the second position, or suction position, to the first position, or blowing position. The second tubular portion or sleeve 600 is fastened on one end of the first tubular portion 700, distal from the opening 5.

In the example shown in FIGS. 14, 15a and 15b, the movable element 300 comprises:
  a first portion 12, or first end portion, distal from the tubular portion 700, and therefore distal from the opening 5;
  and a second portion 15, proximal to the opening 5 and adjacent to the first portion 12.

The second portion 15 has a smaller size than the first portion 12. In particular, the second portion 15 has a radial extension, perpendicular to the longitudinal axis of the body 2, which is smaller than the radial extension of the second portion 12.

Advantageously, the movable element 300 is adapted to move along the longitudinal axis of the body 2 so that, as the position of the first portion 12 varies with respect to the body 2, the size of the gap 400, or more generally, the air passage section, varies.

Preferably, in the blowing position (FIGS. 14 and 15a) the gap 400 is between the internal surface of the end opening 5' of the tubular portion 600 of the body 2 and the external surface of the second portion 15 of the movable element 300; while in the suction position (FIG. 15b) the gap 400 is between the internal surface of the end opening 5' of the tubular portion 600 and the external surface of the first portion 12 of the movable element 300.

End-of-stroke elements are provided to limit the stroke of the movable element 300 in both directions.

For example, the movable element 300 comprises a third portion 16, or second end portion, proximal to the tubular portion 700, and therefore to the opening 5, and adjacent to the second portion 15 of the movable element. The second portion 15 is therefore an intermediate portion between the first portion 12 and the third portion 16.

This third portion 16 has, at least partially, a larger size, in particular a larger radial size, than the second portion 15 such as to define:
  a first abutment surface adapted to abut against an internal shoulder 17 of the tubular portion 600 when the element moves to the blowing position;
  and a second abutment surface, opposite to said first abutment surface, adapted to abut against one end of the tubular portion 700 or against a further internal shoulder of the tubular portion 600 proximal to the tubular portion 700, when the movable element moves to the suction position.

For example, the third portion 16 is provided with at least one protrusion adapted to slide on the internal surface of the sleeve 600 and to abut, in the retracted or suction position, against the tubular portion 700 of the body 2. Preferably said third portion 16 is provided with three radial projections preferably arranged at 120° from one another.

Preferably, the movable element 300 is mushroom-shaped, which is a typical shape of the exhaust or aspiration valves placed in the heads of the four-stroke engines. During the blowing of air from the opening 5 towards the second end of the body 2, the movable element 300 is in the first position (FIGS. 14 and 15a), or advanced position, with the gap 400 having the maximum size thereof, allowing an effective cooling of the preform. In this advanced position, the movable element 300 abuts against the internal shoulder 17 of the sleeve 600.

When changing the configuration of the aeraulic circuit 50, the air suction from the gap 400 towards the opening 5 of the body 2 pushes the movable element 300, by pushing on the third portion 16, to the second position (FIG. 15b), o retracted position, with the gap 400 having the minimum size thereof, allowing the production of a greater vacuum, thus making the extraction of the preform from the respective cooling housing 13 of the extraction plate 500 and the retention thereof on the handling station 20 effective. In this retracted position the movable element 300 abuts against the tubular portion 700 of the body 2.

Preferably, the movable element 300 has a longitudinal extension along the axis X such as to cover, in said retracted position, a distance between the tubular portion 700 and a point enclosed by the internal surface of the second opening 5' (FIG. 15b).

By changing the aeraulic circuit configuration 50 again, the air blowing from the opening 5 towards the opening 5' of the body 2 pushes the movable element 300 to the first position (FIGS. 14 and 15a).

In the seventh embodiment, shown in FIGS. 16 to 22, the body 2 has a second opening 5', coaxial to the longitudinal axis X, at said second end.

In particular, the body 2 of the pin includes a first tubular portion 701, comprising the opening 5 of the first end of the body 2 and is connected to the handling station 20.

The second end of the body 2, opposite to the first end, is provided with a second tubular portion 601, in the form of a sleeve, which defines an end-of-stroke element delimiting, therein, the stroke of the movable element 301 from the second position, or suction position (FIG. 18b), to the first position, or blowing position (FIG. 18a). The second tubular portion, or sleeve, 601 is fastened on one end of the first tubular portion 701, distal from the opening 5. The sleeve 601 is integral with and coaxial to the first tubular portion 701.

Advantageously, the movable element 301 is provided with an internal duct 302 along the longitudinal axis X, preferably coaxial to the axis X, and is adapted to slide
from the first position, or blowing position, in which the at least one gap comprises both the internal duct 302 and at least one portion of the second opening 5' for the passage of the blowing air flow,
to the second position, or suction position, in which the at least one gap is exclusively defined by the internal duct 302 for the passage of the suction air flow. Preferably, the movable element 301 has a central portion 303 provided with at least one protrusion 304 adapted to slide on the internal surface of the sleeve 601 and to abut in the blowing position at the second opening 5', for example abutting against an internal shoulder 17 of the tubular portion 601.

In a variant, shown in FIGS. 19-22, the central portion 303 is provided with three radial protrusions 304, preferably arranged at 120° from one another. In this case (FIG. 20) the at least one gap comprises both the internal duct 302 and three portions 310 of the second opening 5' for the passage of the blowing air flow.

As shown, the three radial protrusions 304 preferably are lobe-shaped with a curvilinear contact surface 307 which corresponds to the internal surface 602 of the sleeve 601 (FIG. 20).

Preferably, the movable element 301 has a first end portion 305 which, in the blowing position, at least partially projects from the second opening 5', and has a second end portion 306, opposite to the first end portion 305, which, in the suction position, is at least partially inserted in an internal duct 200 of the tubular body 701. The central portion 303 is an intermediate portion between the end portions 305, 306.

During the blowing of air from the opening 5 towards the second end of the body 2, the movable element 301 is in the first position (FIG. 18a), or advanced position, with the blowing gap having the maximum size thereof, allowing an effective cooling of the preform. In this advanced position, the movable element 301 abuts against the internal shoulder 17 of the sleeve 601.

When changing the configuration of the aeraulic circuit 50, the air suction from the second opening 5' towards the opening 5 of the body 2 pushes the movable element 301, by pushing on the radial protrusions 304, to the second position (FIG. 18b), o retracted position, with the gap having the minimum size thereof, allowing the production of a greater vacuum, thus making the extraction of the preform from the respective cooling housing 13 of the extraction plate 500 and the retention thereof on the handling station 20 effective. In this retracted position the movable element 301 is partially inserted with the end portion 306 thereof in the tubular portion 701 of the body 2.

By changing the aeraulic circuit configuration 50 again, the air blowing from the opening 5 towards the opening 5' of the body 2 pushes the movable element 301 to the first position (FIG. 18a).

The invention claimed is:

1. A cooling and retaining pin for cooling, by means of air blowing, and retaining, by mean of air suction, a preform of plastic material, the pin comprising:
   a body, defining a longitudinal axis and having, at a first end thereof, a first opening, coaxial with respect to said longitudinal axis and adapted to be connected to a handling station;
   a moveable element adapted to at least partially slide inside said body;
   at least one gap for a passage of air both during a blowing step and during a suction step, said at least one gap being provided at a second end of the body, opposite to the first end, or at said first end;
   wherein the movable element is adapted to move from a first position, corresponding to a first section for the passage of air through said at least one gap, to a second position, corresponding to a second section for the passage of air through said at least one gap, said second section being smaller than said first section, so as to adjust in said first position a blowing air flow during the a cooling step and to adjust in said second position a suction air flow during the a step of retaining the preform.

2. The cooling and retaining pin according to claim 1, wherein the body has a second opening, coaxial to said longitudinal axis, at said second end, wherein said movable element is provided with an internal duct along said longitudinal axis and is adapted to slide from said first position, in which said at least one gap comprises both the internal duct and at least one portion of said second opening for the blowing air flow, to said second position, in which said at least one gap is defined only by said internal duct for the suction air flow.

3. The cooling and retaining pin according to claim 2, wherein said second end of the body is provided with a sleeve, integral and coaxial with respect to the body, adapted to delimit therein a stroke of said movable element (301) from the second position to the first position.

4. The cooling and retaining pin according to claim 3, wherein said movable element has a central portion provided with at least one protrusion adapted to slide on an internal surface of said sleeve and to abut, in said first position, at the second opening.

5. The cooling and retaining pin according to claim 4, wherein said central portion is provided with three radial protrusions.

6. The cooling and retaining pin according to claim 4, wherein said movable element has a first end portion which in said first position projects at least partially from said second opening and has a second end portion, opposite to the first end portion which in said second position is at least partially inserted in an internal duct of the body.

7. The cooling and retaining pin according to claim 1, wherein
   the movable element comprises, along said longitudinal axis, a first portion distal from the first opening and a second portion adjacent to said first portion and proximal to the first opening, the first portion having a size larger with respect to the second portion;

there is provided only one gap, at said second end of the body, which is comprised between an internal surface of the body and an external surface of the movable element;
the movable element is adapted to move so that, when a position of the first portion changes with respect to the body, a size of the gap varies; and
wherein, in the first position, the gap is comprised between the internal surface of the body and the external surface of the second portion, and, in the second position, the gap is comprised between the internal surface of the body and the external surface of the first portion.

8. The cooling and retaining pin according to claim 1, wherein said at least one gap is a single hole or at least two holes, arranged along a circumference coaxial to said longitudinal axis, and wherein the movable element is adapted to move from the first position, corresponding to the first section for the passage of air through said single hole or each hole of said at least two holes, to the second position, corresponding to the second section for the passage of air through said single hole or each hole of said at least two holes.

9. The cooling and retaining pin according to claim 8, wherein said single hole or the at least two holes are at the second end of the body, and said single hole or said at least two holes are provided in said movable element arranged at said second end,
wherein the movable element is in the first position, or advanced position, with said single hole or said at least two holes mainly placed outside the body during a blowing of air from the first opening towards the second end of the body; while the movable element is in the second position, or retracted position, with said single hole or said at least two holes mainly placed inside the body during an aspiration of air from said single hole or from said at least two holes towards the first opening of the body.

10. The cooling and retaining pin according to claim 8, wherein said single hole or the at least two holes are at said second end of the body, and said single hole or said at least two holes are provided on the second end of the body and the movable element is arranged at said second end, and
wherein, when the movable element is in the first position, or advanced position, said single hole or said at least two holes have said first section for the passage of air during a blowing of air from the first opening towards the second end of the body; while, when the movable element is in the second position, or retracted position, said single hole or said at least two holes have said second section for the passage of air, smaller than the first section, during an aspiration of air from said single hole or from said at least two holes towards the first opening of the body; and
wherein said second end of the body is provided, in a more external position with respect to a position of said single hole or said at least two holes, with a sleeve, integral and coaxial with respect to the body, adapted to delimit a stroke of said movable element from the first position to the second position, and vice versa.

11. The cooling and retaining pin according to claim 8, wherein said single hole or said at least two holes are at said second end of the body, and said single hole or said at least two holes are provided on the second end of the body and the movable element is arranged at said second end,
wherein the movable element is provided, in a first stretch thereof, with only one first hole or with at least two first holes having a first size, and provided, in a second stretch thereof, with only one second hole or with at least two second holes having a second size smaller than the first size,
wherein the movable element is in the first position, or advanced position, with said only one first hole or said at least two first holes communicating with said single hole or said at least two holes of the body, respectively, during a blowing of air from the first opening towards the second end of the body; while the movable element is in the second position, or retracted position, with said only one second hole or said at least two second holes communicating with said single hole or said at least two holes of the body, respectively, during an aspiration of air from said single hole or from said at least two holes towards the first opening of the body;
wherein said second end of the body is internally provided with a sliding bush inside which the movable element can slide,
wherein a first end-of-stroke element is integral with the movable element and abuts against an internal shoulder of the body when the movable element is in said first position, and
wherein a second end-of-stroke element is integral with the movable element and abuts against said second end of the body when the movable element is in said second position.

12. The cooling and retaining pin according to claim 8, wherein said single hole or the at least two holes are at said first end, and said single hole or said at least two holes are arranged on the body,
wherein the movable element closes the first opening in said first end,
said movable element being adapted to be arranged in said first position, or retracted position, corresponding to said first section for the passage of air for said single hole or said at least two holes, for a blowing of air from said single hole or from said at least two holes towards the second end of the body,
and being adapted to be arranged in said second position, or advanced position, corresponding to said second section for the passage of air for said single hole or said at least two holes, for an aspiration of air from said second end of the body towards said single hole or said at least two holes; and
wherein in said second end of the body at least one further hole is provided, arranged along a circumference coaxial to said longitudinal axis.

13. A handling station, for handling plastic preforms and adapted to cooperate with an extraction plate adapted to extract the preforms from an injection mold, the handling station comprising a shell defining an internal volume communicating on one side with a plurality of cooling and retaining pins according to claim 1, and adapted to communicate on another side with an aeraulic circuit,
wherein the shell has at least one face provided with said plurality of cooling and retaining pins,
wherein the first end of the body of each pin, having the first opening, is arranged inside said shell, and
wherein the second end of the body of each pin is arranged outside said shell.

14. The handling station according to claim 13, wherein in the case where said at least one gap is a single hole or comprises at least two holes at said first end, said single hole or said at least two holes are arranged on the first end of the body along a circumference coaxial to said longitudinal axis, and wherein in said internal volume actuation means are provided, adapted to actuate the movable element, which closes the first opening, to pass from the first position, corresponding to a first section for the passage of air through for said single hole or said at least two holes, for a blowing of air from said single hole or from said at least two holes towards the second end of the body, to the second position, corresponding to a second section for the passage of air through for said single hole or said at least two holes, for an aspiration of air from said second end of the body towards said single hole or said at least two holes.

15. An apparatus for handling and cooling plastic preforms comprising:
a handling station according to claim 13;
an aeraulic circuit connected to said handling station;
wherein said aeraulic circuit comprises:
a suction duct to aspirate air from the inside of the handling station;
a delivery duct to send air to said handling station;
cooling means arranged along said delivery duct to cool the air sent to said handling station; and
wherein switching means of the aeraulic circuit are further provided, to pass from a first circuit configuration, in which an air passage is possible from the delivery duct to the handling station, to a second circuit configuration, in which an air passage is possible from the handling station to the suction duct, so that air can be blown by means of the plurality of cooling and retaining pins in the first circuit configuration, while air can be aspirated by means of said plurality of cooling and retaining pins in the second circuit configuration.

16. An injection molding machine comprising a casing inside which there are at least provided:
at least one injection mold comprising a plurality of molding cavities;
at least one extraction plate comprising at least one set of cooling housings, adapted to receive and retain at least one set of preforms extracted from said molding cavities; said cooling housings being adapted to remove by conduction a first quantity of thermal energy from said preforms; and
a handling and cooling apparatus according to claim 15, wherein the handling station is configured to pass from a loading position, for cooperating with the extraction plate, to an unloading position for releasing the preforms from said cooling and retaining pins, and wherein, in said loading position, the cooling and retaining pins of the handling station are adapted to cooperate with respective cooling housings of the extraction plate to remove, during a step of blowing air by means of said pins when the aeraulic circuit is in said first circuit configuration, a second amount of thermal energy from said preforms, and then to retain and extract the preforms from said cooling housings during a step of aspirating air through said pins when the aeraulic circuit is in said second circuit configuration.

17. A process for handling and cooling plastic preforms in an injection molding machine according to claim 16, the process comprising the following steps:
providing the handling station in the loading position, arranged facing the extraction plate containing at least one set of preforms in the respective cooling housings, and providing the aeraulic circuit in said first circuit configuration;
inserting the cooling and retaining pins of the handling station in the respective cooling housings and further cooling the preforms contained in the latter by means of air blowing through said pins having the movable element in the first position;
switching the aeraulic circuit, by means of said switching means, from said first circuit configuration to said second circuit configuration and aspirating air through the pins, having the movable element in the second position, to retain the preforms on the handling station;
disengaging the cooling and retaining pins from the respective cooling housings continuing to aspirate air through the pins with the movable element in said second position;
moving the handling station from said loading position to an unloading position, continuing to aspirate air through the pins with the movable element in said second position; and
switching the aeraulic circuit, by means of said switching means, from said second circuit configuration to said first circuit configuration and blowing air through the pins to release the preforms from said pins.

18. The cooling and retaining pin according to claim 9, wherein said second end of the body is provided with a sleeve, integral and coaxial with respect to the body, adapted to delimit therein a stroke of said movable element from the second position to the first position.

* * * * *